US012713385B2

(12) United States Patent
Thomas et al.

(10) Patent No.: US 12,713,385 B2
(45) Date of Patent: Aug. 18, 2026

(54) RECEIVING A SIDELINK POSITIONING RESOURCE GRANT

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ankit Bhamri, Rödermark (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 273 days.

(21) Appl. No.: 18/550,929

(22) PCT Filed: Mar. 15, 2022

(86) PCT No.: PCT/IB2022/052343

§ 371 (c)(1),
(2) Date: Sep. 15, 2023

(87) PCT Pub. No.: WO2022/195487

PCT Pub. Date: Sep. 22, 2022

(65) Prior Publication Data

US 2024/0163835 A1 May 16, 2024

Related U.S. Application Data

(60) Provisional application No. 63/161,409, filed on Mar. 15, 2021.

(51) Int. Cl.
*H04W 64/00* (2009.01)
*H04W 72/232* (2023.01)
(Continued)

(52) U.S. Cl.
CPC ......... *H04W 64/00* (2013.01); *H04W 72/232* (2023.01); *H04W 76/20* (2018.02); *H04W 92/18* (2013.01)

(58) Field of Classification Search
CPC ... H04W 64/00; H04W 76/20; H04W 72/232; H04W 92/18; H04W 4/023; H04W 4/029; H04W 4/40; H04W 76/14; H04L 5/0053
(Continued)

(56) References Cited

U.S. PATENT DOCUMENTS 9,439,039 B1 * 9/2016 Patil ...................... H04W 4/023
2016/0095080 A1 3/2016 Khoryaev et al.
(Continued)

FOREIGN PATENT DOCUMENTS

CN 111989585 A 11/2020
WO 2017027450 A1 2/2017
WO 2020222554 A1 11/2020
WO 2021030583 A1 2/2021

OTHER PUBLICATIONS

PCT/IB2022/052343, "International Search Report and the Written Opinion of the International Searching Authority, or the Declaration", International Searching Authority, Jun. 7, 2022, pp. 1-14.
(Continued)

*Primary Examiner* — Hirdepal Singh
(74) *Attorney, Agent, or Firm* — Kunzler Needham Hilton

(57) ABSTRACT

Apparatuses, methods, and systems are disclosed for extended paging messages. One apparatus includes a transceiver and a processor that triggers a SL positioning resource request by a higher-layer radio protocol. The transceiver requests set of SL resources from a RAN and receives a SL positioning resource grant for performing a SL positioning session with a responder UE. Here, the SL positioning resource grant is applicable to both the initiator UE and responder UE, where the SL positioning resource grant is
(Continued)

associated with source and destination physical layer SL positioning identifiers. The processor reserves a set of SL positioning resources for performing a SL positioning session between the initiator UE and the responder UE. The processor performs a SL positioning procedure using the reserved set of SL positioning resources.

20 Claims, 14 Drawing Sheets

(51) Int. Cl.
*H04W 76/20* (2018.01)
*H04W 92/18* (2009.01)

(58) Field of Classification Search
USPC ........................................................ 455/456.1
See application file for complete search history.

(56) References Cited

U.S. PATENT DOCUMENTS

| | | | | |
|---|---|---|---|---|
| 2018/0035278 | A1* | 2/2018 | Aminaka | H04W 76/14 |
| 2019/0274130 | A1 | 9/2019 | Cheng et al. | |
| 2023/0049053 | A1* | 2/2023 | Lee | H04W 76/14 |
| 2023/0056831 | A1* | 2/2023 | Manolakos | H04L 5/0051 |
| 2023/0232370 | A1* | 7/2023 | Yang | H04B 17/27 370/329 |
| 2024/0031982 | A1* | 1/2024 | Chen | H04W 68/02 |

OTHER PUBLICATIONS

LG Electronics et al., "New SID: Study on use cases, scenarios, and requirements of sidelink positioning", 3GPP TSG RAN Meeting #88e RP-200859, Jun. 29-Jul. 3, 2020, pp. 1-4.

3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.

3GPP, "3rd Generation Partnership Project; Technical Specification Group Services and System Aspects; Service requirements for cyber-physical control applications in vertical domains; Stage 1 (Release 17)", 3GPP TS 22.104 V17.4.0, Sep. 2020, pp. 1-76.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; Service requirements for the 5G system; Stage 1 (Release 18)", 3GPP TS 22.261 V18.1.1, Jan. 2021, pp. 1-85.

3GPP, "3rd Generation Partnership Project; Technical Specification Group Services and System Aspects; Functional stage 2 description of Location Services (LCS) (Release 16)", 3GPP TS 23.271 V16.0.0, Jul. 2020, pp. 1-188.

3GPP, "3rd Generation Partnership Project; Technical Specification Group Radio Access Network; LTE Positioning Protocol (LPP) (Release 16)", 3GPP TS 37.355 V16.3.0, Dec. 2020, pp. 1-298.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.3.0, Dec. 2020, pp. 1-118.

* cited by examiner

Res. Set
ID#1 630
DL-PRS
Resources
ID#1
ID#2
ID#3
ID#N
gNB 2 - TRP1
615
NRPPa
LMF 605
(Location Server)
Resource
Set ID#0
625
DL-PRS Resource ID#3
Resource
Set ID#1
NRPPa
NRPPa
UE 205
gNB 3 - TRP1
620
(i.e., reference/
serving gNB)
Resource
Set ID#1
630
DL-PRS Res. ID#3
gNB 1 -TRP1
610
Resource
Set ID#0
625
NRPPa
600

DL-TDOA Assistance Data 700

```
-- ASN1START

NR-DL-TDOA-ProvideAssistanceData-r16 ::=     SEQUENCE {
   nr-DL-PRS-AssistanceData-r16                 NR-DL-PRS-AssistanceData-r16              OPTIONAL, -- Need ON
   nr-SelectedDL-PRS-IndexList-r16              NR-SelectedDL-PRS-IndexList-r16           OPTIONAL, -- Need ON
   nr-PositionCalculationAssistance-r16         NR-PositionCalculationAssistance-r16      OPTIONAL, -- Cond UEB
   nr-DL-TDOA-Error-r16                         NR-DL-TDOA-Error-r16                      OPTIONAL, -- Need ON
   ...
}
-- ASN1STOP
```

FIG. 7A

DL-TDOA Measurement Report 750

```
-- ASN1START

NR-DL-TDOA-SignalMeasurementInformation-r16 ::= SEQUENCE {
    dl-PRS-ReferenceInfo-r16        DL-PRS-IdInfo-r16,
    nr-DL-TDOA-MeasList-r16         NR-DL-TDOA-MeasList-r16,
    ...
}

NR-DL-TDOA-MeasList-r16 ::=     SEQUENCE (SIZE(1..nrMaxTRPs-r16)) OF
                                    NR-DL-TDOA-MeasElement-r16

NR-DL-TDOA-MeasElemnt-r16 ::=   SEQUENCE {
    trp-ID-r16                      TRP-ID-r16,
    nr-DL-PRS-ResourceId-r16        NR-DL-PRS-ResourceId-r16            OPTIONAL,
    nr-DL-PRS-ResourceSetId-r16     NR-DL-PRS-ResourceSetId-r16         OPTIONAL,
    nr-TimeStamp-r16                NR-TimeStamp-r16,
    nr-RSTD-r16                     CHOICE {
            k0-r16                      INTEGER (0..1970049),
            k1-r16                      INTEGER (0..985025),
            k2-r16                      INTEGER (0..492513),
            k3-r16                      INTEGER (0..246257),
            k4-r16                      INTEGER (0..123129),
            k5-r16                      INTEGER (0..61565),
            ...
    },
    nr-AdditionalPathList-r16       NR-AdditionalPathList-r16               OPTIONAL,
    nr-TimingQuality-r16            NR-TimingQuality-r16,
    nr-DL-PRS-RSRP-Result-r16       INTEGER (0..126)                        OPTIONAL,
    nr-DL-TDOA-AdditionalMeasurements-r16
                                NR-DL-TDOA-AdditionalMeasurements-r16      OPTIONAL,
    ...
}

NR-DL-TDOA-AdditionalMeasurements-r16 ::= SEQUENCE (SIZE (1..3)) OF
                                           NR-DL-TDOA-AdditionalMeasurementElement-r16


NR-DL-TDOA-AdditionalMeasurementElement-r16 ::= SEQUENCE {
    nr-DL-PRS-ResourceId-r16        NR-DL-PRS-ResourceId-r16                OPTIONAL,
    nr-DL-PRS-ResourceSetId-r16     NR-DL-PRS-ResourceSetId-r16             OPTIONAL,
    nr-TimeStamp-r16                NR-TimeStamp-r16,
    nr-RSTD-ResultDiff-r16          CHOICE {
            k0-r16                      INTEGER (0..8191),
            k1-r16                      INTEGER (0..4095),
            k2-r16                      INTEGER (0..2047),
            k3-r16                      INTEGER (0..1023),
            k4-r16                      INTEGER (0..511),
            k5-r16                      INTEGER (0..255),
            ...
    },
    nr-TimingQuality-r16            NR-TimingQuality-r16,
    nr-DL-PRS-RSRP-ResultDiff-r16   INTEGER (0..61)                         OPTIONAL,
    nr-AdditionalPathList-r16       NR-AdditionalPathList-r16               OPTIONAL,
    ...
}

-- ASN1STOP
```

FIG. 7B

RECEIVING A SIDELINK POSITIONING RESOURCE GRANT

CROSS-REFERENCE TO RELATED APPLICATIONS

This application claims priority to U.S. Provisional Patent Application No. 63/161,409 entitled "SCHEDULING ENHANCEMENTS FOR SIDELINK POSITIONING" and filed on 15 Mar. 2021 for Robin Thomas, Karthikeyan Ganesan, Ankit Bhamri, and Ali Ramadan Ali, which application is incorporated herein by reference.

FIELD

The subject matter disclosed herein relates generally to wireless communications and more particularly relates to scheduling enhancements for sidelink positioning.

BACKGROUND

For Third Generation Partnership Project ("3GPP") New Radio ("NR", i.e., $5^{th}$ generation Radio Access Technology ("RAT")), there exists a positioning framework which enables UE-assisted and UE-based positioning methods, there is currently a lack of support for efficient UE-to-UE range determination, which is essential to support relative positioning applications across different vertical services, e.g., Vehicle-to Everything ("V2X"), Public Safety, Industrial Internet-of-Things ("IIoT"), Commercial, etc. There currently exists no specified methods to realize sidelink positioning.

BRIEF SUMMARY

Disclosed are procedures for sidelink positioning. Said procedures may be implemented by apparatus, systems, methods, or computer program products.

One method at a User Equipment ("UE") for sidelink positioning includes triggering a sidelink ("SL") positioning resource request by a higher-layer radio protocol and requesting a set of SL resources from a radio access network ("RAN"). The method includes receiving a SL positioning resource grant for performing a SL positioning session with a responder UE. Here, the SL positioning resource grant is applicable to both the initiator UE and responder UE, where the SL positioning resource grant is associated with source and destination physical layer SL positioning identifiers. The method includes reserving a set of SL positioning resources for performing a SL positioning session between the initiator UE and the responder UE. The method includes performing a SL positioning procedure using the reserved set of SL positioning resources.

One method at a RAN for sidelink positioning includes receiving a request for a set of SL resources from an initiator UE and transmitting a SL positioning resource grant for performing a SL positioning session between the initiator UE and a responder UE. Here, the SL positioning resource grant is applicable to both the initiator UE and the responder UE, where the SL positioning resource grant is associated with source and destination physical layer SL positioning identifiers. The method includes receiving a measurement report from the initiator UE, the measurement report associated with a SL positioning session between the initiator UE and the responder UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A is a diagram illustrating one embodiment of an Abstract Syntax Notation One ("ASN.1") implementation of a DL-TDOA Assistance Data information element ("IE");

FIG. 7B is a diagram illustrating one embodiment of ASN.1 format of a DL-TDOA Measurement Report;

DETAILED DESCRIPTION

Figure 1:
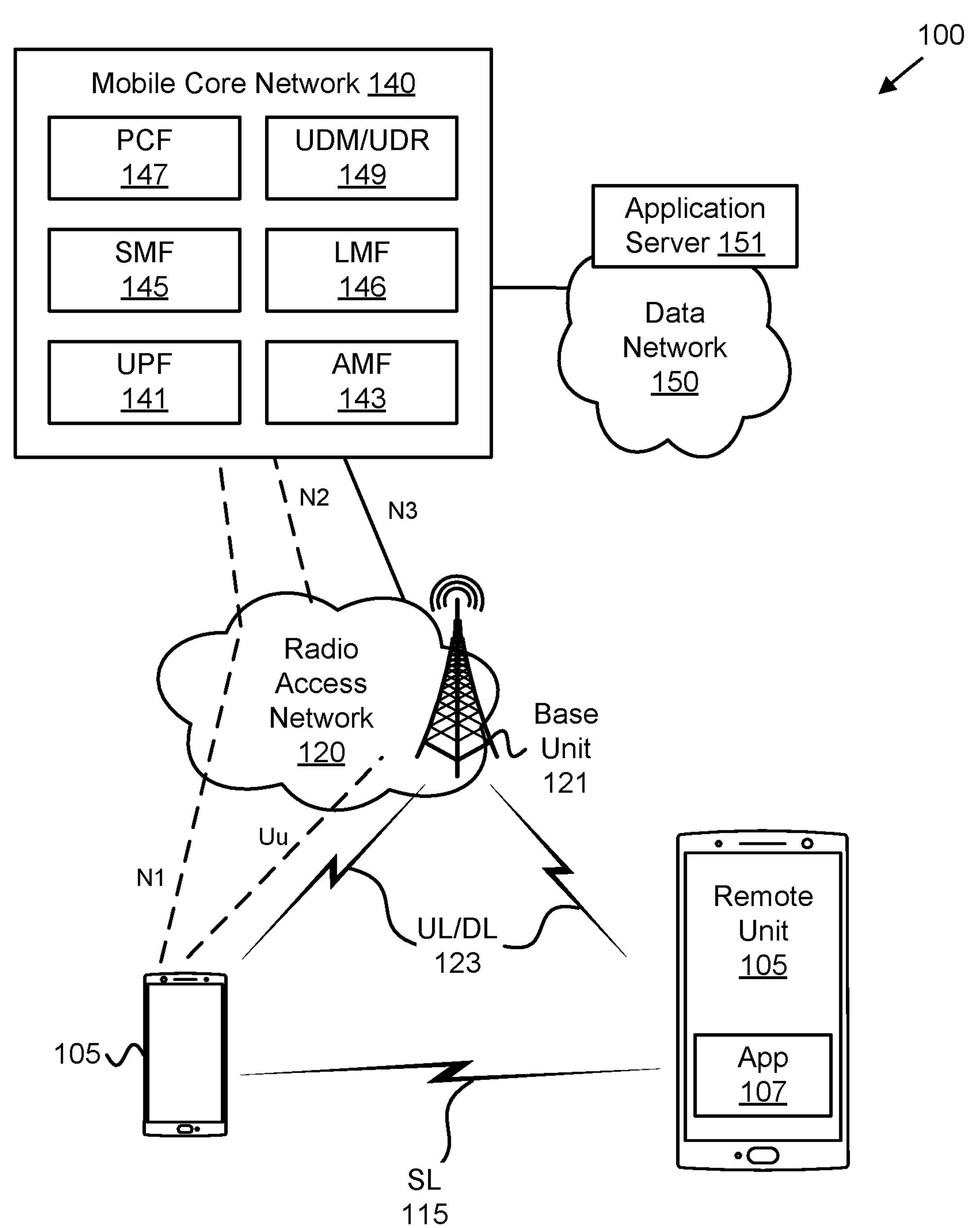
FIG. 1 is a block diagram illustrating one embodiment of a wireless communication system for sidelink positioning.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments oflike elements.

Generally, the present disclosure describes systems, methods, and apparatuses for to enhance sidelink positioning. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions. The present disclosure includes Layer-1 (i.e., physical layer) and Layer-2 solutions related to resource scheduling for UEs performing sidelink positioning.

Disclosed herein are mechanisms to enable efficient sidelink positioning. Dynamic and configured grants can be issued to an initiator UE for the purpose of low latency, high precision ranging based on different configured PRS Types. In one embodiment, the configured PRS Types are for UEs using a centralized resource allocation scheme. In another embodiment, the configured PRS Types are for UEs using a distributed resource allocation scheme. Positioning-specific Layer-1 IDs (i.e., physical layer IDs) for ranging can be derived based on a number of described ways including: A) Implicit derivation based on a ranging application trigger; B) Implicit derivation based on a novel SL Positioning transaction ID; and/or C) Explicit generation on physical layer of positioning-specific ID. Various solutions define configurations of a reference device to correct for timing errors, including the key novel aspects of report the precise location and associated quality metrics.

Different SL radio architecture variants for SL positioning are described in the below solutions. Various solutions define resource request procedures, including prioritization corresponding to SL Positioning. Different cyclic shift configuration variants based on physical layer positioning-specific IDs are described in the below solutions. Various solutions define SL Positioning session and associated transactions to encapsulate the messages associate with a particular ranging session between an initiator and responder UE.

FIG. 1 depicts a wireless communication system 100 for sidelink positioning, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In various embodiments, the remote units 105 may communicate directly with each other (e.g., device-to-device communication) using sidelink (e.g., V2X communication) signals 115. Here, SL transmissions may occur on SL resources. A remote unit 105 may be provided with different SL communication resources for different SL resource allocation modes. SL resource allocation Mode-1 corresponds to a network-scheduled (e.g., centralized) SL communication mode that uses the NR RAT. SL resource allocation Mode-2 corresponds to a UE-scheduled (e.g., distributed/decentralized) SL communication mode that uses the NR RAT. SL resource allocation Mode-3 corresponds to a network-scheduled SL communication mode that uses the LTE RAT. SL resource allocation Mode-4 corresponds to a UE-scheduled SL communication mode that uses the LTE RAT.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, abase station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The LMF 146 receives measurements and assistance information from the RAN 120 and the remote unit 105 via the AMF 143 over the 'NLs' interface to determine the location/position of the remote unit 105. In some embodiments, the LMF 146 configures the remote unit 106 via the AMF 143. The RAN 120 configures the remote unit 105 using radio resource control ("RRC") protocol over the Uu interface (e.g., LTE-Uu and/or NR-Uu). The PCF 147 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for sidelink positioning apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), NR BS, 5G NB, Transmission and Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for sidelink positioning.

Figure 2:
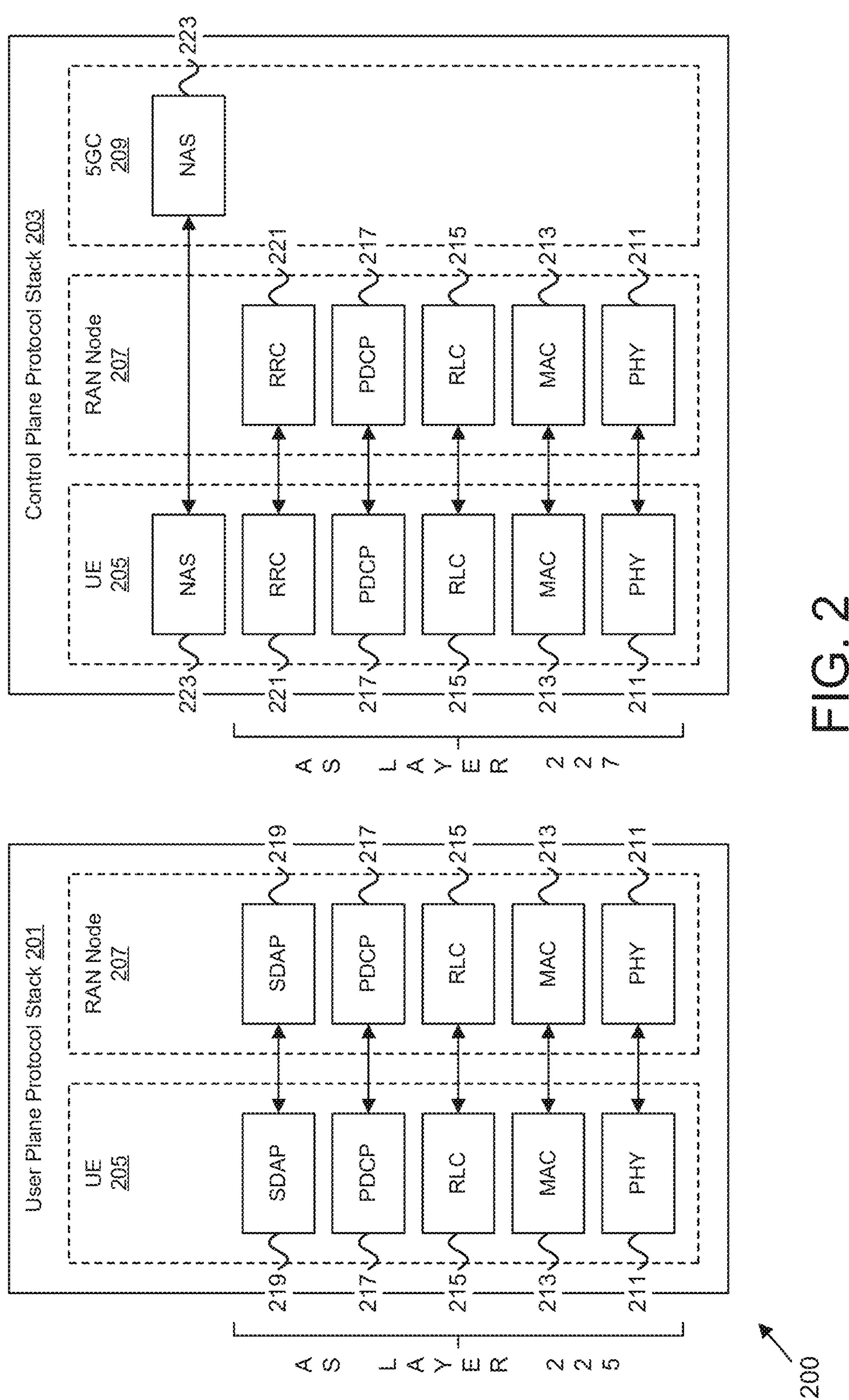
FIG. 2 is a diagram illustrating one embodiment of a Third Generation Partnership Project ("3GPP") New Radio ("NR") protocol stack.

FIG. 2 depicts a NR protocol stack 200, according to embodiments of the disclosure. While FIG. 2 shows a UE 205, a RAN node 207 and the 5G core network 209, these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 211, a Medium Access Control ("MAC") sublayer 213, a Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a physical layer 211, a MAC sublayer 213, a RLC sublayer 215, and a PDCP sublayer 217. The Control Place protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least SDAP, PDCP, RLC and MAC sublayers, and the physical layer. The AS layer 227 for the Control Plane protocol stack 203 consists of at least RRC, PDCP, RLC and MAC sublayers, and the physical layer. The Layer-1 ("L1") contains the PHY layer 211. The Layer-2 ("L2") is split into the SDAP, PDCP, RLC and MAC sublayers. The Layer-3 ("L3") includes the RRC sublayer 221 and the NAS layer 223 for the control plane and includes, e.g., an Internet Protocol ("IP") layer or PDU Layer (note depicted) for the user plane. L1 and L2 are referred to as "lower layers," while L3 and above (e.g., transport layer, application layer) are referred to as "higher layers" or "upper layers." As an example, "upper layer signaling" may refer to signaling exchange at the RRC layer 221.

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 offers QoS flows to the core network (e.g., 5GC). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs").

The NAS layer 223 is between the UE 205 and the 5GC 209. NAS messages are passed transparently through the RAN. The NAS layer 223 is used to manage the establishment of communication sessions and for maintaining continuous communications with the UE 205 as it moves between different cells of the RAN. In contrast, the AS layer 225/227 is between the UE 205 and the RAN carries information over the wireless portion of the network. While not depicted in FIG. 2, the IP layer exists above the NAS layer 223, a transport layer exists above the IP layer, and an application layer exists above the transport layer.

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the physical layer through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks, etc.

Figure 3:
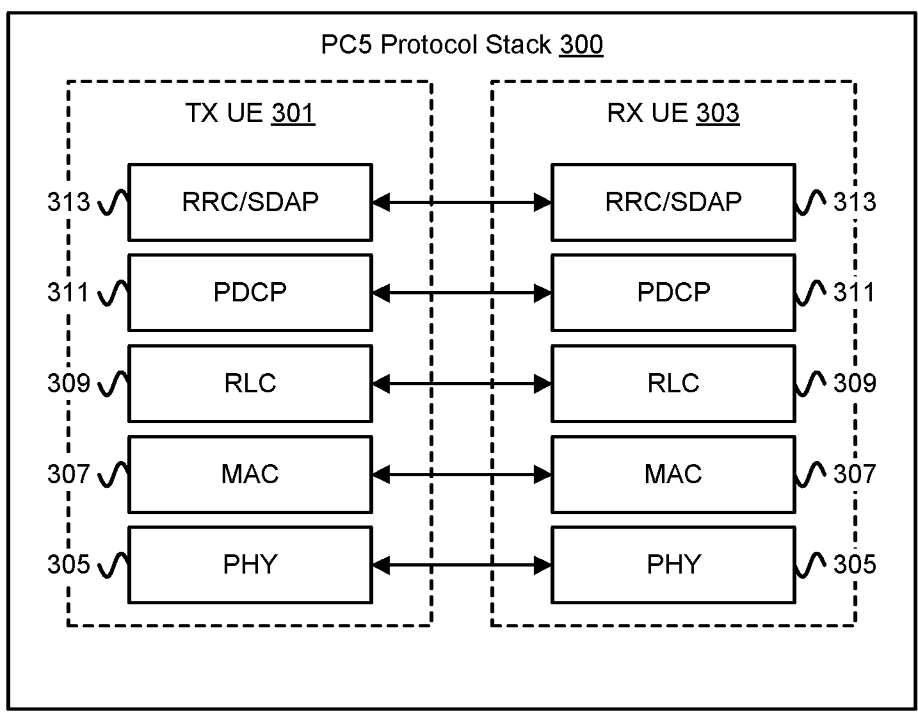
FIG. 3 is a diagram illustrating one embodiment of a 3GPP PC5 protocol stack.

FIG. 3 depicts a PC5 protocol stack 300, according to embodiments of the disclosure. While FIG. 3 shows a transmitting SL UE 301 (denoted "TX UE") and a receiving SL UE 303 (denoted "RX UE"), these are representative of a set of UEs communicating peer-to-peer via PC5 and other embodiments may involve different UEs. As depicted, the protocol stack 300 includes a physical layer 305, a MAC sublayer 307, a RLC sublayer 309, a PDCP sublayer 311, and RRC and SDAP layers (depicted as combined element "RRC/SDAP" 313), forthe control plane and user plane, respectively. The physical layer 305, the MAC sublayer 307, the RLC sublayer 309, the PDCP sublayer 311, and the RRC/SDAP layers 313 may perform substantially the same functions described above with reference to the NR protocol stack 200, but supporting UE-to-UE communications between the TX UE 301 and the RX UE 303.

The AS protocol stack for the control plane in the PC5 protocol stack 300 consists of at least RRC, PDCP, RLC and MAC sublayers, and the physical layer. The AS protocol stack for the user plane in the PC5 protocol stack 300 consists of at least SDAP, PDCP, RLC and MAC sublayers, and the physical layer. The L2 is split into the SDAP, PDCP, RLC and MAC sublayers. The L3 includes the RRC sublayer and the NAS layer for the control plane and includes, e.g., an IP layer for the user plane. L1 and L2 are referred to as "lower layers", while L3 and above (e.g., transport layer, V2X layer, application layer) are referred to as "higher layers" or "upper layers."

Regarding positioning performance requirements and positioning methods, for Rel-17, the different positioning requirements are especially stringent with respect to accuracy, latency and reliability.

The supported positioning techniques in Rel-16 are listed in Table 1, below. These techniques are defined in 3GPP Technical Specification ("TS") 38.305.

TABLE 1

Supported Rel-16 UE positioning methods

| Method | UE-based | UE-assisted, LMF-based | NG-RAN node assisted | Secure User-Plane Location ("SUPL") |
|---|---|---|---|---|
| A-GNSS | Yes | Yes | No | Yes (UE-based and UE-assisted) |
| OTDOA [Note1, Note 2] | No | Yes | No | Yes (UE-assisted) |
| E-CID [Note 3] | No | Yes | Yes | Yes for E-UTRA (UE-assisted) |
| Sensor | Yes | Yes | No | No |
| WLAN | Yes | Yes | No | Yes |
| Bluetooth | No | Yes | No | No |

TABLE 1-continued

Supported Rel-16 UE positioning methods

| Method | UE-based | UE-assisted, LMF-based | NG-RAN node assisted | Secure User-Plane Location ("SUPL") |
|---|---|---|---|---|
| TBS [Note 4] | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | — | No |
| UL-TDOA | No | No | Yes | No |
| UL-AoA | No | No | Yes | No |

*NOTE1*:

This includes Terrestrial Beacon System ("TBS") positioning based on PRS signals.

*NOTE 2*:

In this version of the specification only Observed Time Difference of Arrival ("OTDOA") based on LTE signals is supported.

*NOTE 3*:

This includes Cell-ID for NR method.

*NOTE 4*:

In this version of the specification only for TBS positioning based on Metropolitan Beacon System ("MBS") signals.

Separate positioning techniques as indicated in Table 1 can be currently configured and performed based on the requirements of the Location Management Function ("LMF") and user Equipment ("UE") capabilities. The transmission of Positioning Reference Signals ("PRS") enables the UE to perform UE positioning-related measurements to enable the computation of a UE's location estimate and are configured per Transmission Reception Point ("TRP"), where a TRP may transmit one or more beams.

The following RAT-dependent positioning techniques are supported in Rel-16: DL-TDoA; DL-AoD; Multi-RTT; E-CID; UL-TDoA; UL-AoA.

The DL-TDoA (Downlink Time Difference of Arrival) positioning method makes use of the DL Reference Signal Time Difference ("RSTD") (and optionally DL PRS Reference Signal Received Power ("RSRP")) of downlink signals received from multiple Transmission Points ("TPs"), at the UE. The UE measures the DL RSTD (and optionally DL PRS RSRP) of the received signals using assistance data received from the positioning server, and the resulting measurements are used along with other configuration information to locate the UE in relation to the neighboring TPs.

The DL-AoD (Downlink Angle-of-Departure) positioning method makes use ofthe measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

The Multi-RTT (Multiple Round Trip Time) positioning method makes use of the UE Rx-Tx measurements and DL PRS RSRP of downlink signals received from multiple TRPs, measured by the UE and the measured gNB Rx-Tx measurements and UL Sounding Reference Signal RSRP ("SRS-RSRP") at multiple TRPs of uplink signals transmitted from UE.

Figure 4:
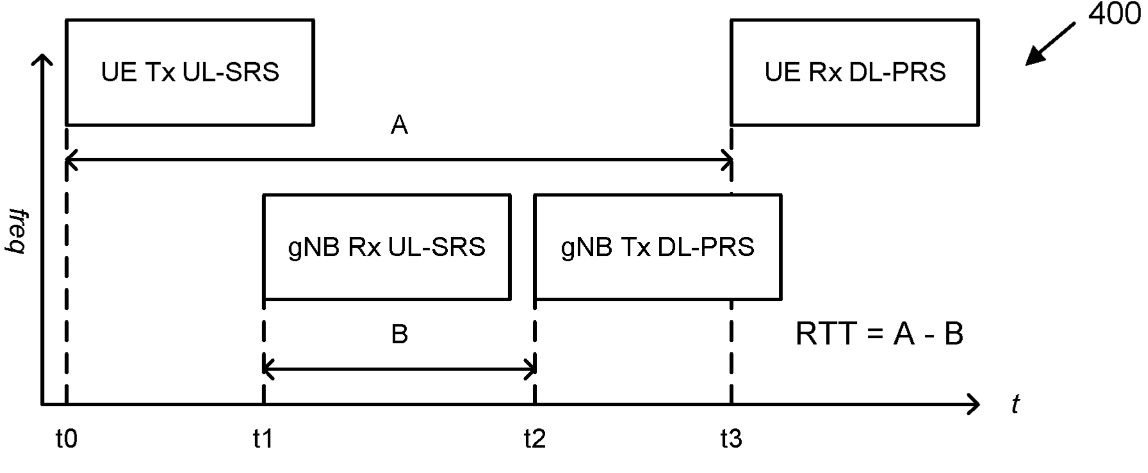
FIG. 4 is a diagram illustrating one embodiment of a Multi-Cell RTT Procedure.

FIG. 4 depicts an exemplary Multi-Call RTT procedure 400. The UE measures the UE Rx-Tx measurements (and optionally DL PRS RSRP of the received signals) using assistance data received from the positioning server (e.g., LMF server), and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE.

Figure 5:
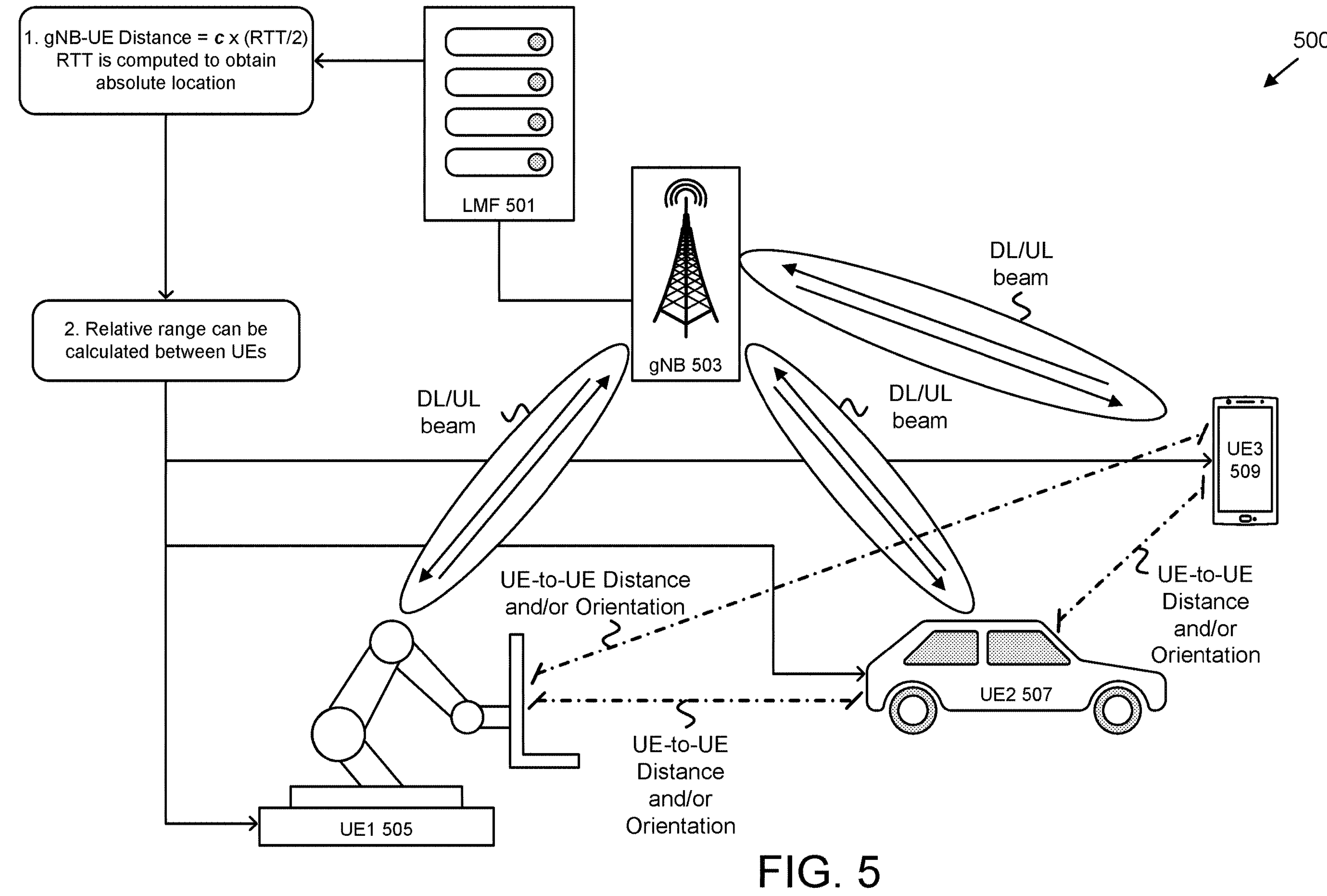
FIG. 5 is a diagram illustrating one embodiment of Relative range estimation using the existing single gNB RTT positioning framework.

FIG. 5 depicts an example procedure 500 for relative range estimation using RTT positioning techniques. The procedure 500 involves a LMF server 501, a gNB 503, and a plurality of UEs, including a first UE 505 (denoted "UE1"), a second UE 507 (denoted "UE2"), and a third UE 509 (denoted "UE3"). The LMF server 501 may be one embodiment of the LMF 146, the gNB 503 may be one embodiment of the RAN node 207 and/or the base unit 121, and the UEs may be embodiments of the UE 205, the TX UE 301 and/or RX UE 303.

At step 1, the gNB-UE distance is determined as half the gNB-UE RTT multiplied by the speed of light. The gNB-UE RTT is computed and used by the LMF server 501 to obtain an absolute location of a UE. Note that the LMF server 501 may use RTT measurements and beam orientation from a single gNB 503 to obtain the absolute UE location. In other embodiments, the LMF server 501 may use RTT measurements from multiple TRPs to obtain the absolute UE location.

At Step 2, the relative range (i.e., UE-to-UE distance) may be calculated between the UEs. Note that the relative UE-to-UE orientations may also be calculated. The UE1 505, UE2 507, and UE3 509 may determine UE-to-UE distances and orientations using the below described SL positioning techniques.

Referring again to RAT-dependent positioning techniques, in the Enhanced Cell ID (E-CID) positioning method, the position of a UE is estimated with the knowledge of its serving ng-eNB, gNB and cell and is based on Uu (e.g., LTE) signals. The information about the serving ng-eNB, gNB and cell may be obtained by paging, registration, or other methods. NR Enhanced Cell ID (NR E-CID) positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning; i.e., the positioning procedures do not supply a measurement configuration or measurement control message, and the UE reports the measurements that it has available rather than being required to take additional measurement actions.

The UL-TDoA (Uplink Time Difference of Arrival) positioning method makes use of the UL TDOA (and optionally UL SRS-RSRP) at multiple RPs of uplink signals transmitted from UE. The RPs measure the UL TDOA (and optionally UL SRS-RSRP) of the received signals using assistance data received from the positioning server, and the resulting measurements are used along with other configuration information to estimate the location of the UE.

The UL-AoA (Uplink Angle-of-Arrival) positioning method makes use of the measured azimuth and the zenith of arrival at multiple RPs of uplink signals transmitted from UE. The RPs measure A-AoA and Z-AoA of the received signals using assistance data received from the positioning server, and the resulting measurements are used along with other configuration information to estimate the location of the UE.

RAT-dependent positioning techniques involve the 3GPP RAT and core network entities to perform the position estimation of the UE, which are differentiated from RAT-independent positioning techniques which rely on Global Navigation Satellite System ("GNSS"), Inertial Measurement Unit ("IMU") sensor, WLAN and Bluetooth technologies for performing target device (i.e., UE) positioning.

The following RAT-Independent positioning techniques are supported in Rel-16: Network-assisted GNSS, Barometric pressure sensor positioning, WLAN positioning, Bluetooth positioning, TBS positioning, Motion sensor positioning.

The network-assisted GNSS (Global Navigation Satellite System) methods make use of UEs that are equipped with radio receivers capable of receiving GNSS signals. In 3GPP specifications the term GNSS encompasses both global and regional/augmentation navigation satellite systems.

Examples of global navigation satellite systems include Global Positioning System ("GPS"), Modernized GPS, Galileo, GLObal'naya NAvigatsionnaya Sputnikovaya Sistema ("GLONASS"), and BeiDou Navigation Satellite System ("BDS"). Regional navigation satellite systems include Quasi Zenith Satellite System ("QZSS") while the many augmentation systems, are classified under the generic term of Space Based Augmentation Systems ("SBAS") and provide regional augmentation services. In this concept, different GNSSs (e.g., GPS, Galileo, etc.) can be used separately or in combination to determine the location of a UE.

Regarding barometric pressure sensor positioning, the barometric pressure sensor method makes use of barometric sensors to determine the vertical component of the position of the UE. The UE measures barometric pressure, optionally aided by assistance data, to calculate the vertical component of its location or to send measurements to the positioning server for position calculation. This method should be combined with other positioning methods to determine the 3D position of the UE.

Regarding WLAN positioning, the WLAN positioning method makes use of the WLAN measurements (AP identifiers and optionally other measurements) and databases to determine the location of the UE. The UE measures received signals from WLAN access points ("APs"), optionally aided by assistance data, to send measurements to the positioning server for position calculation. Using the measurement results and a references database, the location of the UE is calculated. Alternatively, the UE makes use of WLAN measurements and optionally WLAN AP assistance data provided by the positioning server, to determine its location.

Regarding Bluetooth positioning, the Bluetooth positioning method makes use of Bluetooth measurements (beacon identifiers and optionally other measurements) to determine the location of the UE 205. The UE 205 measures received signals from Bluetooth beacons. Using the measurement results and a references database, the location of the UE 205 is calculated. The Bluetooth methods may be combined with other positioning methods (e.g., WLAN) to improve positioning accuracy of the UE.

A Terrestrial Beacon System ("TBS") consists of a network of ground-based transmitters, broadcasting signals only for positioning purposes. Regarding TBS positioning, the current type of TBS positioning signals are the MBS (Metropolitan Beacon System) signals and Positioning Reference Signals ("PRS"). The UE 205 measures received TBS signals, optionally aided by assistance data, to calculate its location or to send measurements to the positioning server for position calculation.

Regarding IMU/motion sensor positioning, this method makes use of different sensors such as accelerometers, gyros, magnetometers, to calculate the displacement of UE. The UE 205 estimates a relative displacement based upon a reference position and/or reference time. UE sends a report comprising the determined relative displacement which can be used to determine the absolute position. This method should be used with other positioning methods for hybrid positioning.

Figure 6:
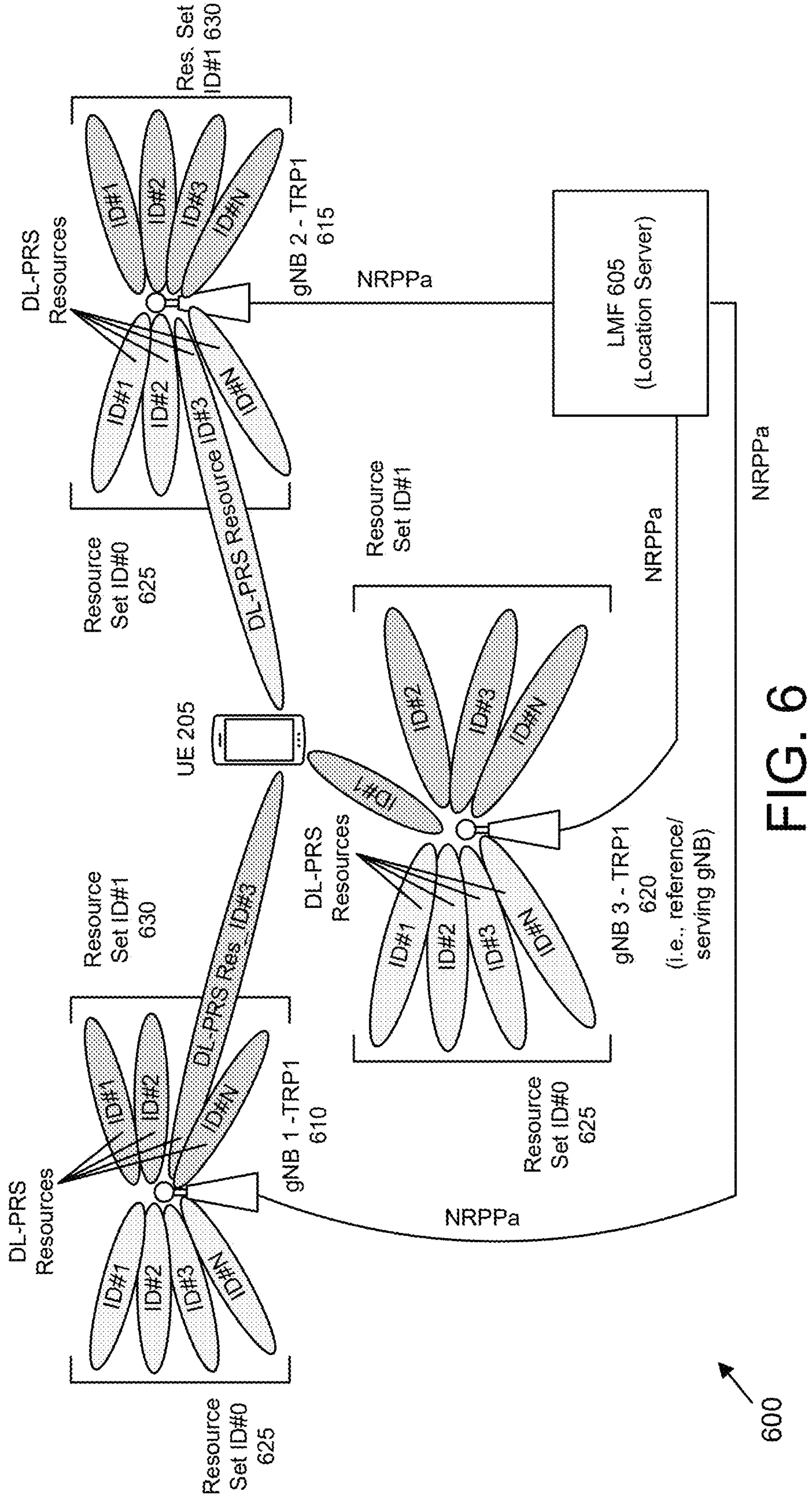
FIG. 6 is a diagram illustrating one embodiment of NR Beam-based Positioning.

FIG. 6 shows a diagram 600 for NR beam-based positioning. According to Rel-16, the PRS can be transmitted by different base stations (serving and neighboring) using narrow beams over Frequency Range #1 ("FR1", i.e., frequencies between 410 MHz to 7.125 GHz) and Frequency Range #2 ("FR2", i.e., between 24.25 GHz to 52.6 GHz), which is relatively different when compared to LTE where the PRS was transmitted across the whole cell. As illustrated in FIG. 6, a UE 205 may receive PRS from a first gNB ("gNB #1) 610 which is a serving gNB, and also from a neighboring second gNB ("gNB #2) 615, and a neighboring third gNB ("gNB #3) 620.

Here, the PRS can be locally associated with a PRS Resource ID and Resource Set ID for a base station (i.e., TRP). In the depicted embodiments, each gNB 610, 615, 620 is configured with a first Resource Set ID 625 and a second Resource Set ID 630. As depicted, the UE 205 receives PRS on transmission beams; here, receiving PRS from the gNB #1 610 on PRS Resource ID #1 from the second Resource Set ID 630, receiving PRS from the gNB #2 615 on PRS Resource ID #3 from the second Resource Set ID 630, and receiving PRS from the gNB #3 620 on PRS Resource ID #3 from the first Resource Set ID 625.

Similarly, UE positioning measurements such as Reference Signal Time Difference ("RSTD") and PRS RSRP measurements are made between different beams (e.g., between a different pair of DL PRS resources or DL PRS resource sets)—as opposed to different cells as was the case in LTE. The LMF server 605 uses the UE positioning measurements to determine the UE's location (e.g., absolute location). In addition, there are additional UL positioning methods for the network to exploit in order to compute the target UE's location. Table 2 and Table 3 show the reference signal to measurements mapping required for each of the supported RAT-dependent positioning techniques at the UE and gNB, respectively.

TABLE 2

| UE Measurements to enable RAT-dependent positioning techniques | | |
|---|---|---|
| DL/UL Reference Signals | UE Measurements | To facilitate support of the following positioning techniques |
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx − Tx time difference | Multi-RTT |
| Rel. 15 Synchronization Signal Block ("SSB")/ CSI-RS for Radio Resource Management ("RRM") | SS-RSRP (RSRP for RRM), SS-RSRQ(for RRM), CSI-RSRP (for RRM), CSI-RSRQ (for RRM), SS-RSRPB (for RRM) | E-CID |

TABLE 3

| gNB Measurements to enable RAT-dependent positioning techniques | | |
|---|---|---|
| DL/UL Reference Signals | gNB Measurements | To facilitate support of the following positioning techniques |
| Rel. 16 SRS for positioning | UL Relative Time of Arrival ("RTOA") | UL-TDOA |
| Rel. 16 SRS for positioning | UL SRS-RSRP | UL-TDOA, UL-AoA, Multi-RTT |
| Rel. 16 SRS for positioning, Rel. 16 DL PRS | gNB Rx − Tx time difference | Multi-RTT |
| Rel. 16 SRS for positioning, | Angle-of-Arrival ("AoA") and Zenith-of-Arrival ("ZoA") | UL-AoA, Multi-RTT |

For 3GPP Rel-16, a DL PRS Resource ID in a DL PRS Resource set is associated with a single beam transmitted from a single transmit-receive point ("TRP") (note that a TRP may transmit one or more beams). A DL PRS occasion is one instance of periodically repeated time windows (consecutive slot(s)) where DL PRS is expected to be transmitted. With regards to Quasi-Co-Location ("QCL") relations beyond Type-D of a DL PRS resource, support one or more of the following options:

Option 1: QCL-TypeC from a Synchronization Signal Block ("SSB") from a TRP.

Option 2: QCL-TypeC from a DL PRS resource from a TRP.

Option 3: QCL-TypeA from a DL PRS resource from TRP.

Option 4: QCL-TypeC from a Channel State Information Reference Signal ("CSI-RS") resource from a TRP.

Option 5: QCL-TypeA from a CSI-RS resource from a TRP.

Option 6: No QCL relation beyond Type-D is supported.

Note that QCL-TypeA refers to Doppler shift, Doppler spread, average delay, delay spread; QCL-TypeB refers to Doppler shift, Doppler spread'; QCL-TypeC refers to Average delay, Doppler shift; and QCL-TypeD refers to Spatial Receive ("Rx") parameter.

For a DL PRS resource, QCL-TypeC from an SSB from a TRP (Option 1) is supported. An identity ("ID") is defined that can be associated with multiple DL PRS Resource Sets associated with a single TRP. An ID is defined that can be associated with multiple DL PRS Resource Sets associated with a single TRP. This ID can be used along with a DL PRS Resource Set ID and a DL PRS Resources ID to uniquely identify a DL PRS Resource. Each TRP should only be associated with one such ID.

DL PRS Resource IDs are locally defined within DL PRS Resource Set. DL PRS Resource Set IDs are locally defined within TRP. The time duration spanned by one DL PRS Resource set containing repeated DL PRS Resources should not exceed DL-PRS-Periodicity. Parameter DL-PRS-ResourceRepetitionFactor is configured for a DL PRS Resource Set and controls how many times each DL-PRS Resource is repeated for a single instance of the DL-PRS Resource Set. Supported values include: 1, 2, 4, 6, 8, 16, 32.

As related to NR positioning, the term "positioning frequency layer" refers to a collection of DL PRS Resource Sets across one or more TRPs which have:

The same Subcarrier Spacing ("SCS") and Cyclic Prefix ("CP") type

The same center frequency

The same point-A (already agreed)

All DL PRS Resources of the DL PRS Resource Set have the same bandwidth

All DL PRS Resource Sets belonging to the same Positioning Frequency Layer have the same value of DL PRS Bandwidth and Start Physical Resource Block ("PRB")

Duration of DL PRS symbols in units of ms a UE can process every T ms, assuming 272 PRB allocation is a UE capability.

UE measurements which are applicable to DL-based positioning techniques are discussed below. For a conceptual overview, the assistance data configurations (see FIG. 7A) and measurement information (see FIG. 7B) are provided for each of the supported positioning techniques.

FIG. 7A shows one example of an Abstract Syntax Notation 1 ("ASN.1") implementation of the information element ("IE") NR-DL-TDOA-ProvideAssistanceData 700. The NR-DL-TDOA-ProvideAssistanceData is used by the location server to provide assistance data to enable UE-assisted and UE-based NR downlink TDOA. It may also be used to provide NR DL TDOA positioning specific error reason.

FIG. 7B shows one example of an ASN.1 implementation of the IE NR-DL-TDOA-SignalMeasurementInformation 750. The NR-DL-TDOA-SignalMeasurementInformation is used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

Regarding RAT-dependent Positioning Measurements, the different DL measurements including DL PRS-RSRP, DL RSTD and UE Rx-Tx Time Difference required for the supported RAT-dependent positioning techniques are shown in Table 4. The following measurement configurations are specified as follows:

4 Pair of DL RSTD measurements can be performed per pair of cells. Each measurement is performed between a different pair of DL PRS Resources/Resource Sets with a single reference timing.

8 DL PRS RSRP measurements can be performed on different DL PRS resources from the same cell.

TABLE 4

| DL Measurements required for DL-based positioning methods | |
|---|---|
| | DL PRS reference signal received power ("RSRP") |
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth.<br>For FR1, the reference point for the DL PRS-RSRP shall be the antenna connector of the UE. For FR2, DL PRS-RSRP shall be measured based on the combined signal from antenna elements corresponding to a given receiver branch. For FR1 and FR2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |
| | DL reference signal time difference (DL RSTD) |
| Definition | DL reference signal time difference (DL RSTD) is the DL relative timing difference between the positioning node j and the reference positioning node i, defined as<br>$T_{SubframeRxj} - T_{SubframeRxi}$,<br>Where:<br>$T_{SubframeRxj}$ is the time when the UE receives the start of one subframe from positioning node j.<br>$T_{SubframeRxi}$ is the time when the UE receives the corresponding start of one subframe from positioning node i that is closest in time to the subframe received from positioning node j.<br>Multiple DL PRS resources can be used to determine the start of one subframe from a positioning node.<br>For FR1, the reference point for the DL RSTD shall be the antenna connector of the UE. For FR2, the reference point for the DL RSTD shall be the antenna of the UE. |
| Applicable for | RRC_CONNECTED intra-frequency, RRC_CONNECTED inter-frequency |
| | UE Rx − Tx time difference |
| Definition | The UE Rx − Tx time difference is defined as $T_{UE\text{-}RX} - T_{UE\text{-}TX}$<br>Where:<br>$T_{UE\text{-}RX}$ is the UE received timing of downlink subframe #i from a positioning node, defined by the first detected path in time.<br>$T_{UE\text{-}TX}$ is the UE transmit timing of uplink subframe #j that is closest in time to the subframe #i received from the positioning node.<br>Multiple DL PRS resources can be used to determine the start of one subframe of the first arrival path of the positioning node.<br>For FR1, the reference point for $T_{UE\text{-}RX}$ measurement shall be the Rx antenna connector of the UE and the reference point for $T_{UE\text{-}TX}$ measurement shall be the Tx antenna connector of the UE. For FR2, the reference point for $T_{UE\text{-}RX}$ measurement shall be the Rx antenna of the UE and the reference point for $T_{UE\text{-}TX}$ measurement shall be the Tx antenna of the UE. |
| Applicable for | RRC_CONNECTED intra-frequency, RRC_CONNECTED inter-frequency |

The Integrity and Reliability of the positioning estimate is defined by the following parameters: Alert Limit ("AL"); Time-to-Alert ("TTA"); Target Integrity Risk ("TIR").

The Alert Limit parameter indicates the maximum allowable positioning error such that the positioning system is available for the intended application. If the positioning error is beyond the AL, operations are hazardous, and the positioning system should be declared unavailable for the intended application to prevent loss of integrity. Note that when the AL bounds the positioning error in the horizontal plane or on the vertical axis then it is called Horizontal Alert Limit ("HAL") or Vertical Alert Limit ("VAL") respectively.

The Time-to-Alert parameter indicates the probability that the positioning error exceeds the Alert Limit ("AL") without warning the user within the required Time-to-Alert ("TTA").

The Target Integrity Risk parameter indicates the maximum allowable elapsed time from when the positioning error exceeds the Alert Limit ("AL") until the function providing position integrity annunciates a corresponding alert. Note that the TIR is usually defined as a probability rate per some time unit (e.g., per hour, per second or per independent sample).

This present disclosure details solutions for enhancing the scheduling mechanism for UEs performing ranging, which is based on different PRS Types. This can improve the ranging resource efficiency for SL resource allocation Mode-1 UEs and SL resource allocation Mode-2 UEs. An overview of the methods is presented as follows:

A first solution describes techniques to enable efficient resource allocation triggers and request for performing a ranging session in different coverage scenarios. In the first solution set, the coverage scenarios include in-coverage, partial coverage, and out-of-coverage areas.

A second solution describes techniques to enable positioning-specific ID management related to a ranging session based on the transmitted PRS Type signal. The second solution set includes explicit and implicit techniques to derive the positioning-specific ID. The positioning-specific ID can be based on the physical layer (i.e., Layer-1) and Layer-2 IDs, depending on the applicable scenario. The positioning-specific IDs can be used as a basis to generate cyclic shifts for PRS Type 1 signals. The second solution set enables different SL radio architecture variants for SL positioning.

A third solution describes techniques to enable prioritization of SL positioning information for efficient resource allocation. The third solution defines a new SL radio bearer configuration for SL positioning.

A fourth solution describes techniques to configure cyclic shifts in an efficient manner for UEs performing ranging in a groupcast ranging scenario.

A fifth solution describes techniques to configure and schedule an anchor UE/reference UE with a known location, which does not necessarily take part in a localization/ranging session but assists in improving the absolute/relative location estimate via, e.g., correction of timing delays.

As used herein: "Controller" refers to a device that controls the ranging session and defines the ranging parameters by sending the ranging control information; "Controlee" refers to a device that utilizes the ranging parameters received from the controller by decoding the ranging control message; "Initiator device" refers to the UE which transmits the first ranging message exchange following the transmission/reception of the ranging control message; "Responder device" refers to the UE which responds to the initial ranging message received from the initiator.

Please note that although the embodiments described in this disclosure mainly refer to SL ranging methods where the initiating and responding devices are UEs, similar methods may be applied when base station is the initiating device (using corresponding signaling methods). In various embodiments, Solutions 1-4 can be implemented in combination with each other to enable the ranging solutions described herein and where applicable can be supported for the Uu and SL interface.

For the purposes of this disclosure, a positioning-related reference signal may be referred to as a reference signal used for positioning procedures/purposes in order to estimate a target-UE's location, e.g., PRS, or based on existing reference signals such as Channel State Information Reference Signal ("CSI-RS") or Sounding Reference Signal ("SRS"); a target-UE may be referred to as the device/entity to be localized/positioned. In various embodiments, the term 'PRS' may refer to any signal such as a reference signal, which may or may not be used primarily for positioning.

For the purposes of this disclosure, the term "target-UE" may be used to refer to a UE of interest whose position (absolute or relative) is to be obtained by the network or by the UE itself. The location server is an entity, where the positioning measurements are processed and the positioning estimate of the UE is computed, e.g., may comprise of LMF (location management function).

Beneficially, the solutions described herein support efficient resource scheduling for UEs participating in a SL ranging session using different PRS Types in all coverage scenarios including: in-coverage, partial coverage, and out-of-coverage.

Beneficially, the solutions described herein support efficient generation of physical layer IDs for the purposes of ranging based on different PRS Types. The solutions described herein also support configuration of cyclic shifts to reduce interference based on the PRS Type for different groupcast ranging scenarios.

Beneficially, the solutions described herein support configuration and location information reporting of a reference device to compensate timing delay errors for both network-based (Uu) and sidelink-based (SL) positioning.

Hereafter, the considered ranging signals in this disclosure will be referred to as follows:

PRS Type-1 Signals uses the pseudo random signal sequence design using, e.g., a gold sequence as outlined in TS 38.211.

PRS Type-2 Signals makes use of a Zadoff-chu sequences with orthogonal cyclic shifts.

PRS Type-3 Signals makes use of a pulse-based waveform (e.g., root-raised cosine pulse, sine pulse) with a ≤2 ns pulse duration with a configured pulse repetition frequency transmitted over a wide bandwidth (e.g., 400 MHz).

Furthermore, PRS Type-1, PRS Type-2 and PRS Type-3 signals can be applicable to both the Uu and PC5 interface, although the scope of this disclosure primarily covers methods related to sidelink ("SL") interface (i.e., PC5).

According to embodiments of the first set of solutions, different resource allocation triggers and procedures are defined corresponding to the different PRS Types for supporting a ranging session using a centralized resource allocation scheme (Mode-1) and a decentralized resource allocation scheme (Mode-2).

First embodiments of the first solution related to centralized scheduling for ranging. According said first embodiments, the RAN node 207 may provision or schedule the following SL resources for different configured PRS Type ranging methods based on the type of ranging request: Dynamic positioning grant and/or Configured (e.g., semi-static) positioning grant.

A dynamic positioning grant can be issued to the initiator UE based on an immediate ranging request between a pair of UEs, i.e., between the initiator UE and responder UE. A configured positioning grant can be issued to the initiator UE based on a periodic ranging request to the responder UE, of which one or more combinations of the following configurations can be configured to the UE. In one embodiment, the configured positioning grant may be activated using RRC signaling, which can be referred to as a Type 1 Configured Grant ("CG", i.e., a semi-persistent grant of radio resources). In another embodiment, the configured positioning grant may be activated/deactivated using Downlink Control Information ("DCI") signaling (using the Physical Downlink Control Channel ("PDCCH")), which can be referred to as a Type 2 CG. Furthermore, the periodicity of the grant can also be signaled to the UE. In one implementation, CG configuration includes the destination ID or destination group ID.

The gNB can configure multiple CGs to an initiator UE, and aware of the ranging service may activate a subset of CGs from the total configured CGs for the initiator UE and activate the remaining number of CGs from the total configured CGs (from initiator UE), for the responder UE to provide the reply PRS Type signal or the measurement report associated to a ranging session. In an alternative implementation related to groupcast ranging, the remaining subset of CGs may be distribute among participating group member responder UEs in a particular ranging session.

In one implementation the initiator UE shares, using SCI, the configured positioning grant with the responder UE for performing the measurement on the PRS resources. In another implementation, the gNB configures both UEs with PRS grant, the initiator UE with the PRS resources and the responder UE with resources for performing the measurements and other resources for reporting. In another implementation, the initiator UE shares the CG configuration with one or more responder UEs using PC5 RRC and these CG config are dedicatedly used for that particular destination only.

In an alternative implementation, the RAN node 207 collocated with the Location Measurement Function ("LMF") or with Location Measurement Unit ("LMU") functionality may also provision SL resources for ranging using RRC/DCI signaling as mentioned above.

In another implementation, in the event that the LMF configures the SL PRS Type signals, it may align its periodic PRS Type configuration with the periodicity of the configured grant provided by the gNB. The alignment may be signaled to the gNB via the NR Positioning Protocol Annex ("NRPPa") interface or vice versa.

Second embodiments of the first solution relate to distributed scheduling for ranging. According said second embodiments, the initiator UE may reserve resources for a ranging session using SCI signaling, e.g., first stage SCI. The initiator UE can reserve resources related to a ranging session and notify surrounding UEs via SCI signaling, and in addition may also reserve resources on behalf of the responder UE in order to receive the ranging reply and/or measurement report. In one implementation, ranging pair resource reservation may be sent using the same SCI signaling, while in an alternative implementation, the initiator UE may reserve resources using one type of SCI signaling, e.g., first stage SCI, and indicate in an extra bit to the responder devices to use the reserved resource for PRS transmission and in another implementation, initiator UE schedule resources for the responder UE(s) using another type of SL control signaling such as 2nd stage SCI.

In another related embodiment, the initiator UE may reserve/schedule resources for all responder UEs in a group (member UEs) in the case of a groupcast ranging session. Responder UE could use the same time/frequency resource but with different PRS frequency domain offset (comb pattern) or different cyclic shifts. Responder UEs could use implicit mechanism of mapping internal group member ID to the different PRS frequency domain offset (comb pattern) or different cyclic shifts.

A second set of solutions details the different variants of generating a positioning-specific identifier ("ID"), that enables physical layer ranging identification and resource allocation between a pair of UEs. According to embodiments of the second solution, on the physical layer, there exists a source and destination ID of a SL transmission that represents IDs associated with the transmitting ("Tx") UE and one (unicast) or more (groupcast) receiver ("Rx") UEs. Similarly, in the case of ranging using different PRS Type signals, such IDs need to differentiate the positioning transactions between the initiator UE and responder UE(s). A SL positioning transaction involves the exchange of one or more messages for the purposes of performing SL positioning and can be applicable to both absolute and relative location estimation. In one implementation, ranging ID is signaled in SCI, in MAC CE, in PC5 RRC, or in combinations thereof.

First embodiments of the second solution related to centralized scheduling for ranging. According said first embodiments, initiator UE (e.g., TX UE 205) may explicitly indicate or implicitly derive the positioning-specific ID for SL positioning session. This SL positioning session may comprise of a ranging session, and/or any other positioning network session.

In one implementation, the initiator UE may derive the physical layer positioning source and destination ID from Layer-2 (L2) by taking a subset (e.g., octet) of LSB (least significant bits) or MSB (most significant bits). It should be noted that in this case, it can be assumed that the higher layers (e.g., application layer) provides a separate SL positioning-specific source and destination ID, different from the existing Layer-2 source and destination IDs.

In an alternative implementation, the SL positioning-specific IDs and V2X layer/Application generated source and destination IDs may overlap. In this case the L2 24-bit source and destination IDs may be mapped to 8-bit source IDs and 16-bit destination positioning-specific Layer-1 ("L1") IDs. In other implementations, the ProSe layer may generate the source and destination IDs.

In another implementation, the initiator/responder UE may explicitly derive the L1 positioning-specific ID physical layer ID using in number of ways, e.g., using a pseudorandom number/sequence generator or deterministic random number generators or based on the cyclic shift of the Zadoff-Chu sequence for PRS Type 2, where different IDs correspond to different cyclic shifts. In another further implementation, the L1 IDs may be used to generate a scrambled time sequence using encryption standards such as 128, 192 and 256-bits to enable physical layer security for ranging.

Second embodiments of the second solution related to centralized scheduling for ranging. According said second embodiments, an SL positioning session can also be initiated between a Location Server and the pair of target UEs in order to obtain relative location related measurements or an absolute/relative location estimates or the transfer of any SL positioning assistance/configuration data. In another implementation, the SL positioning session can be initiated between a gNB and pair of target UEs. The gNB may also be equipped with Location Management Function ("LMF") functionality or co-located with the gNB in this case.

A single SL positioning session is used to support a single location request, which can either correspond to requests for a single Mobile Terminated-Ranging Request, Mobile Originated-Ranging Request or Network Induced-Ranging Request, as defined below. In another implementation, the SL positioning session may comprise also of a single Location Request of Mobile Terminated Location Request ("MT-LR"), Mobile Originated Location Request ("MO-LR"), Network Induced Location Request ("NI-LR") as defined in TS 23.271.

- Mobile Terminated Ranging Request ("MT-RR"): Refers to a ranging request, that is initiated by a Location Services ("LCS") client or Application Function ("AF") or V2X/ProSe Application Layer that may be external to or internal to a serving PLMN. These entities can trigger a ranging request to the PLMN (which may be the home PLMN ("HPLMN") or visited PLMN ("VPLMN")) for the range of a target pair of UEs.
- Mobile Originated Ranging Request ("MO-RR"): Refers to a ranging request, where the initiator UE triggers a request to a serving PLMN for relative location for a pair of target UEs.
- Network Induced Ranging Request ("NI-RR"): Refers to a ranging request that is initiated by a serving AMF for a target pair of UEs/set of UE pairs depending on a particular service (e.g., regulatory, or public safety).

Multiple SL positioning sessions can be used between the same endpoints, e.g., between location server and initiator UE/responder UE to support multiple different location requests. Each SL positioning session comprises one or more SL positioning transactions, with each SL positioning transaction performing a single operation, e.g., signaling procedures needed to support a ranging session (capability exchange, assistance data/configuration transfer, ranging rounds or location information transfer). SL positioning transactions can be indicated using a standalone SL positioning protocol, e.g., SL Positioning Protocol ("SLPP"). In other implementations, the SL positioning transactions can be indicated on PC5 RRC level. Each SL positioning session can be associated with a SL positioning transaction ID in order to associate messages with one another (e.g., request and response).

In alternative implementation, the SL positioning transaction ID may be equivalent to the PC5 RRC transaction ID, implying that the PC5 RRC transaction can perform a single ranging operation, e.g., signaling procedures needed to support a ranging session (capability exchange, assistance data/configuration transfer, ranging rounds or location information transfer).

This SL positioning transaction ID may be forwarded to the initiator and responder UEs, where the initiator and responder UEs can implicitly derive the positioning-specific source and destination IDs from the SL positioning transaction ID, respectively.

In an alternative implementation, the positioning-specific source and destination ID is indicated to the initiator UE by the gNB. The initiator UE can indicate this L1 IDs to surrounding UEs for the purposes of SL positioning. In an alternative related implementation, the positioning-specific source and destination ID is indicated to the initiator UE by the LMF via gNB forwarding using LTE Positioning Protocol ("LPP"). The corresponding L1 source and destination IDs are then derived from the LPP layer by deriving a subset of bits.

Third embodiments of the second solution relate to SL positioning radio architecture. In the above descriptions, it is assumed that the SL Positioning protocol can be a standalone protocol in the Access Stratum ("AS"), where SL positioning sessions and transactions and associated IDs could be managed along the PC5 interface. The third set of embodiments describes the various SL protocol stack radio architecture variants.

Figure 8:
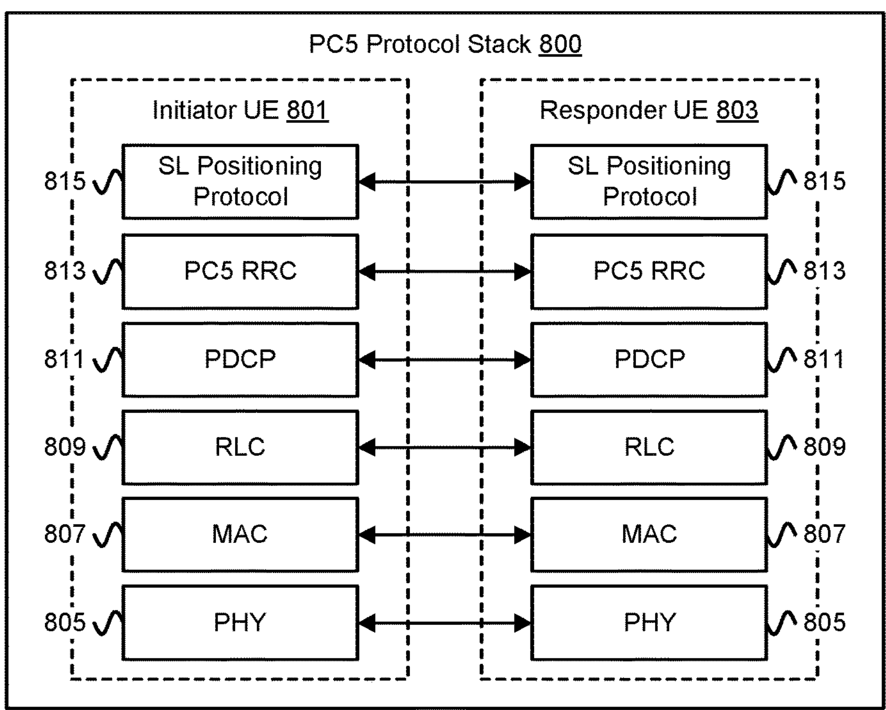
FIG. 8 is a diagram illustrating one embodiment of a PC5 Standalone SL Positioning Protocol Radio Architecture.

FIG. 8 depicts a Protocol Stack 800 for a first variant of a SL Positioning Radio Architecture, according to embodiments of the disclosure. The protocol stack 800 shows an SL initiator UE 801 (e.g., an embodiment of the TX UE 301) and an SL responder UE 803 (e.g., an embodiment of the RX UE 303), these are representative of a set of UEs communicating peer-to-peer via PC5 and other embodiments may involve different UEs. Similar to the PC5 protocol stack 300, the protocol stack 800 includes a physical layer 805, a MAC sublayer 807, a RLC sublayer 809, a PDCP sublayer 811, and an RRC layer 813. These layers may perform substantially the same functions described above with reference to the PC5 protocol stack 300.

The first variant shown in FIG. 8 is a standalone SL Positioning Radio Architecture, where the SL Positioning Protocol layer 815 is a standalone protocol layer which is above the PC5 RRC layer in the Protocol Stack 800. The SL positioning transactions are generated in the SL Positioning Protocol layer 815, which can be encapsulated in a PC5 RRC message to trigger the SL positioning measurement and reporting.

Figure 9:
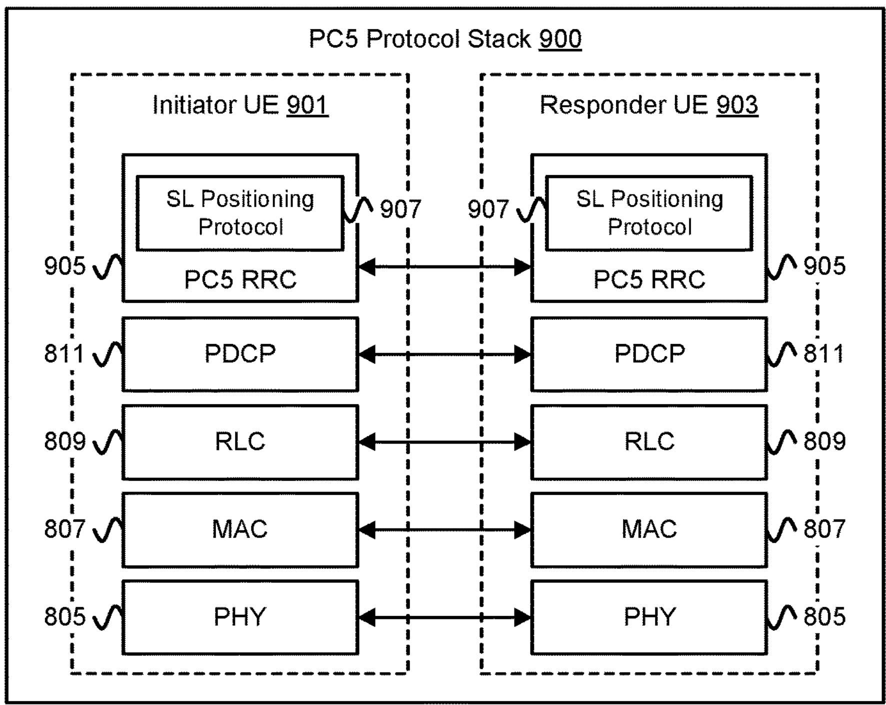
FIG. 9 is a diagram illustrating one embodiment of a PC5 RRC-based SL Positioning Radio Architecture.

FIG. 9 depicts a second variant of SL Positioning Protocol Stack Radio Architecture, according to embodiments of the disclosure. The protocol stack 900 shows the SL initiator UE 801 and the SL responder UE 803. Similar to the PC5 protocol stack 300, the protocol stack 900 includes a physical layer 805, a MAC sublayer 807, a RLC sublayer 809, a PDCP sublayer 811. These layers may perform substantially the same functions described above with reference to the PC5 protocol stack 300.

The second variant shown in FIG. 9 includes an RRC layer 905 which, in addition to performing the above described RRC layer function, includes SL Positioning Protocol functionality 907. According to the second variant, the SL positioning messages including capability exchange, assistance data/configuration transfer, ranging rounds or location information transfer are generated in the PC5 RRC layer 905.

Figure 10:
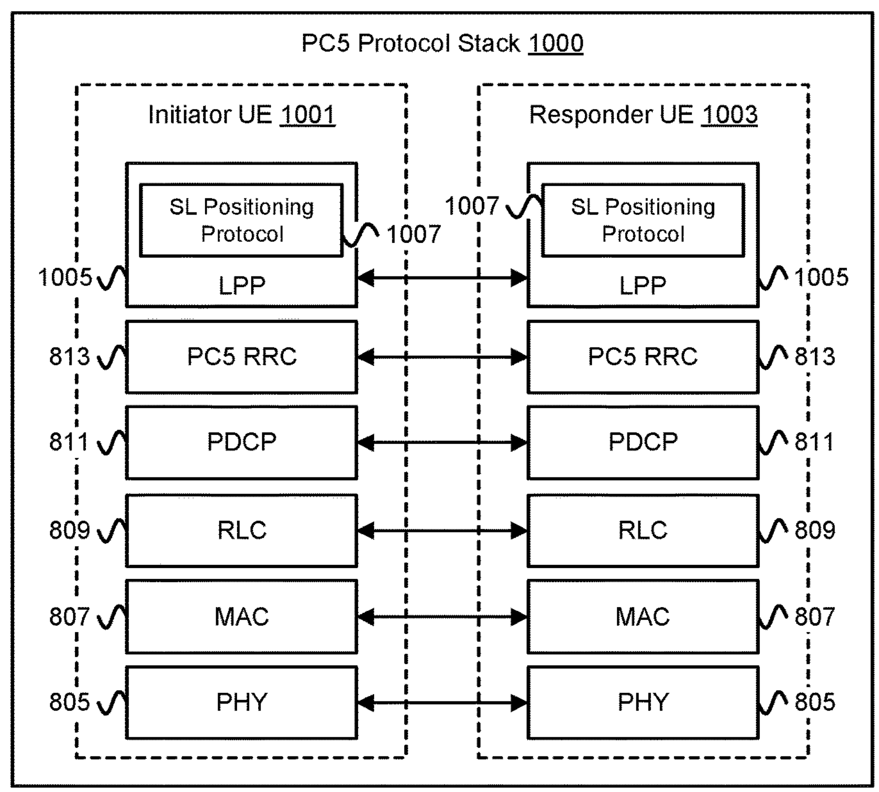
FIG. 10 is a diagram illustrating one embodiment of an LTE Positioning Protocol ("LPP")-based SL Positioning Radio Architecture.

FIG. 10 depicts a third variant of SL Positioning Protocol Stack Radio Architecture, according to embodiments of the disclosure. The protocol stack 1000 shows the SL initiator UE 801 and the SL responder UE 803. Similar to the PC5 protocol stack 300, the protocol stack 1000 includes a physical layer 805, a MAC sublayer 807, a RLC sublayer 809, a PDCP sublayer 811, and an RRC layer 813. These layers may perform substantially the same functions described above with reference to the PC5 protocol stack 300.

The second variant shown in FIG. 10 includes an LPP layer 1005 which includes SL Positioning Protocol functionality 1007. According to the third variant, the SL positioning messages including capability exchange, assistance data/configuration transfer, ranging rounds or location information transfer are generated in a SL LPP layer, that shares the functionality with the LPP layer 1005 on the Uu (UL and DL) interface, such as transport of NAS messages.

According to embodiments of a third solution, the initiator of a ranging session (i.e., initiator UE) can initiate a scheduling request when triggered by a SL Positioning session. Currently, for each PC5-RRC connection the following SL Signaling Resource Bearers ("SRBs") are defined:

- One sidelink SRB (i.e., SL-SRB0) is used to transmit the PC5-S message(s) before the PC5-S security has been established.
- One sidelink SRB (i.e., SL-SRB1) is used to transmit the PC5-S messages to establish the PC5-S security.
- One sidelink SRB (i.e., SL-SRB2) is used to transmit the PC5-S messages after the PC5-S security has been established, which is protected.
- One sidelink SRB (i.e., SL-SRB3) is used to transmit the PC5-RRC signaling, which is protected and only sent after the PC5-S security has been established.

According to embodiments of a third solution, a new SL signaling radio bearer can be defined for the purposes of transmitting sidelink positioning information, e.g., SL-SRB4. Exemplary logical channel configuration parameters pertaining to the Sidelink Control Channel ("SCCH"), which can be at least applied to SL-SRB4 are shown in Table 5.

TABLE 5

SCCH Logical Channel Configuration Parameters for SL-SRB4 (SL Positioning Information)

| Name | Value | Semantics description |
|---|---|---|
| PDCP configuration | | |
| >t-Reordering | Undefined | Selected by the receiving UE, up to UE implementation |
| >pdcp-SN-Size | 12 | |
| RLC configuration | | AM RLC |
| >sn-FieldLength | 12 | |
| >t-Reassembly | Undefined | Selected by the receiving UE, up to UE implementation |
| >logicalChannelIdentity | 3 | |
| MAC configuration | | |
| >priority | 1 | |
| >prioritisedBitRate | infinity | |

TABLE 5-continued

SCCH Logical Channel Configuration Parameters for SL-SRB4 (SL Positioning Information)

| Name | Value | Semantics description |
|---|---|---|
| >logicalChannelGroup | 0 | |
| >schedulingRequestId | 0 | The scheduling request configuration with this value is applicable for this SCCH if configured by the network. |

In an alternate implementation, the sidelink positioning messages can be transmitted using SL-SRB3, i.e., using the SL control channel ("SCCH"), which transports PC5-RRC signaling messages and this logical channel can be mapped to the sidelink shared channel ("SL-SCH") transport channel.

In another implementation, the SL-SRB4 can encapsulate NAS messages containing SL positioning information, which can be sent directly to the location server, e.g., LMF. SL Positioning information may include messages such as positioning capability exchange, assistance data/configuration transfer, ranging rounds or location information transfer.

Figure 11:
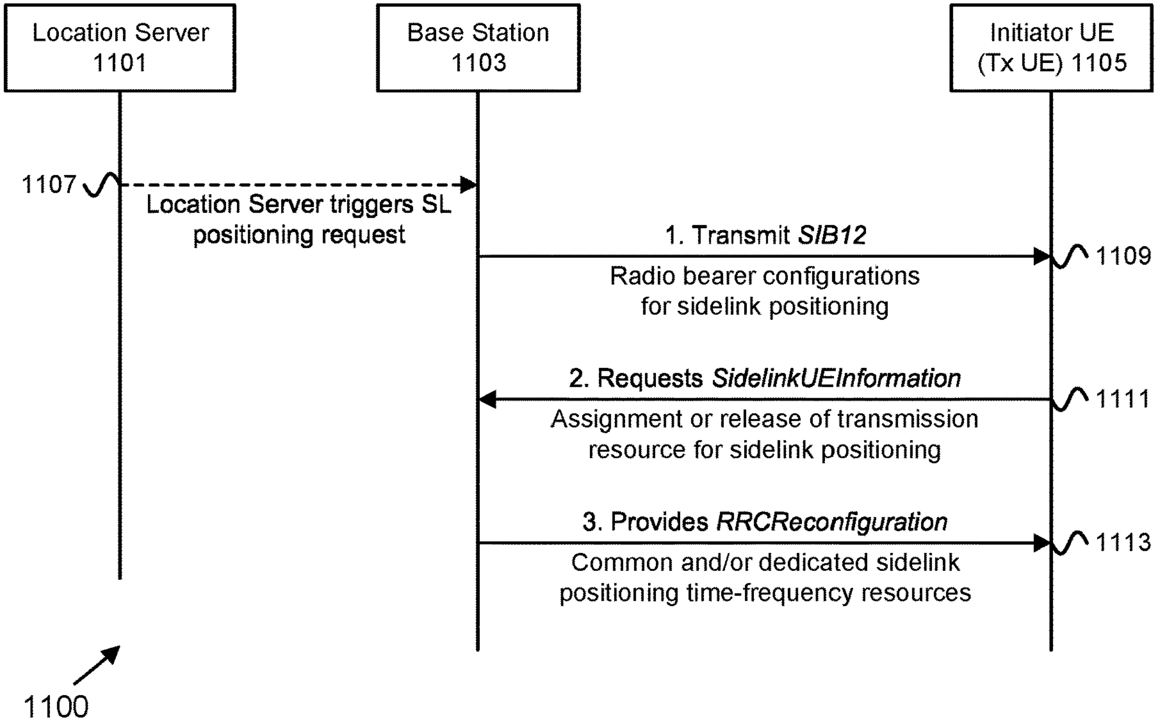
FIG. 11 is a diagram illustrating one embodiment of a base station configuring SL radio bearers for sidelink positioning.

FIG. 11 depicts a procedure 1100 of a base station for configuring SL radio bearers for sidelink positioning, according to embodiments of the disclosure. The procedure 1100 involved a location server 1101 (e.g., an LMF), a base station 1103 (e.g., an embodiment of the RAN node 207) and an initiator UE 1105 (e.g., an embodiment of the TX UE 301, the initiator UE 801, the initiator UE 901, and/or the initiator UE 1001).

As a prerequisite, the location server 1101 may trigger the base station 1103 to provide a sidelink radio bearer configuration for the initiator UE 1105, e.g., via the NR Positioning Protocol Annex ("NRPPa") interface (see messaging 1107).

At Step 1, the base station 1103 may broadcast the appropriate positioning sidelink radio bearer configurations to the initiator UE via system information messages (see messaging 1109).

At Step 2, the initiator UE 1105 may request resources for performing sidelink positioning including ranging, e.g., via transmission of the Sidelink UE Assistance information message (see messaging 1111).

At Step 3, the base station 1103 may respond with a configuration that may include one or more combination of a common sidelink positioning resource pool and/or dedicated sidelink positioning resource pool (see messaging 1113). The sidelink positioning resource pool may include resources to either perform network-based positioning and/or UE-based positioning.

In an alternative implementation, the common sidelink positioning resource pool configuration for one or more UEs, may be broadcasted via system information block ("SIB") messages.

In another implementation, the radio bearer configuration for sidelink may be preconfigured to support Mode-2 UEs, who are in partial coverage or out-of-coverage (using distributed resource allocation scheme). The sidelink UE information message may also contain the ranging cast type, ranging capability information, ranging quality of service indicators such as confidence intervals, horizontal and/or vertical accuracies, integrity and reliability information such as Alert limit ("AL"), Time to alert ("TTA") and Target Integrity Risk ("TIR").

For PDU(s) associated with one Sidelink Control Information ("SCI"), the MAC can consider only logical channels with the same positioning-specific Source Layer-2 ID-Destination Layer-2 ID pair, as defined in the Second solution, for one of unicast, groupcast and broadcast ranging session which is associated with the pair. The MAC entity can prioritize the logical channels based on each SCI in the following order:

- Control plane data such as SL positioning information included in the Sidelink Control Channel ("SCCH")
- Sidelink Channel State Information ("CSI") Reporting MAC Control Element ("MAC CE")
- User plane data from Sidelink Transport Channel ("STCH")

The Scheduling Request ("SR") for resource allocation pertaining to a SL positioning session will be triggered by the sidelink Buffer Status Report ("BSR") and thereafter the MAC entity performs SR procedure. The SL positioning session may be unidirectional (from initiator UE to responder UE) or bidirectional (from initiator UE to responder UE and then responder UE to initiator UE).

The SR configuration of the logical channel that triggered the Sidelink Buffer Status Report ("BSR") is also considered as corresponding Scheduling Request ("SR") configuration for the triggered SR. The value of the priority of the triggered SR corresponds to the value of priority of the logical channel that carries the SL positioning information, which is the highest priority, e.g., priority is 1 according to Table 5 (where lower value indicates higher priority).

Figure 12:
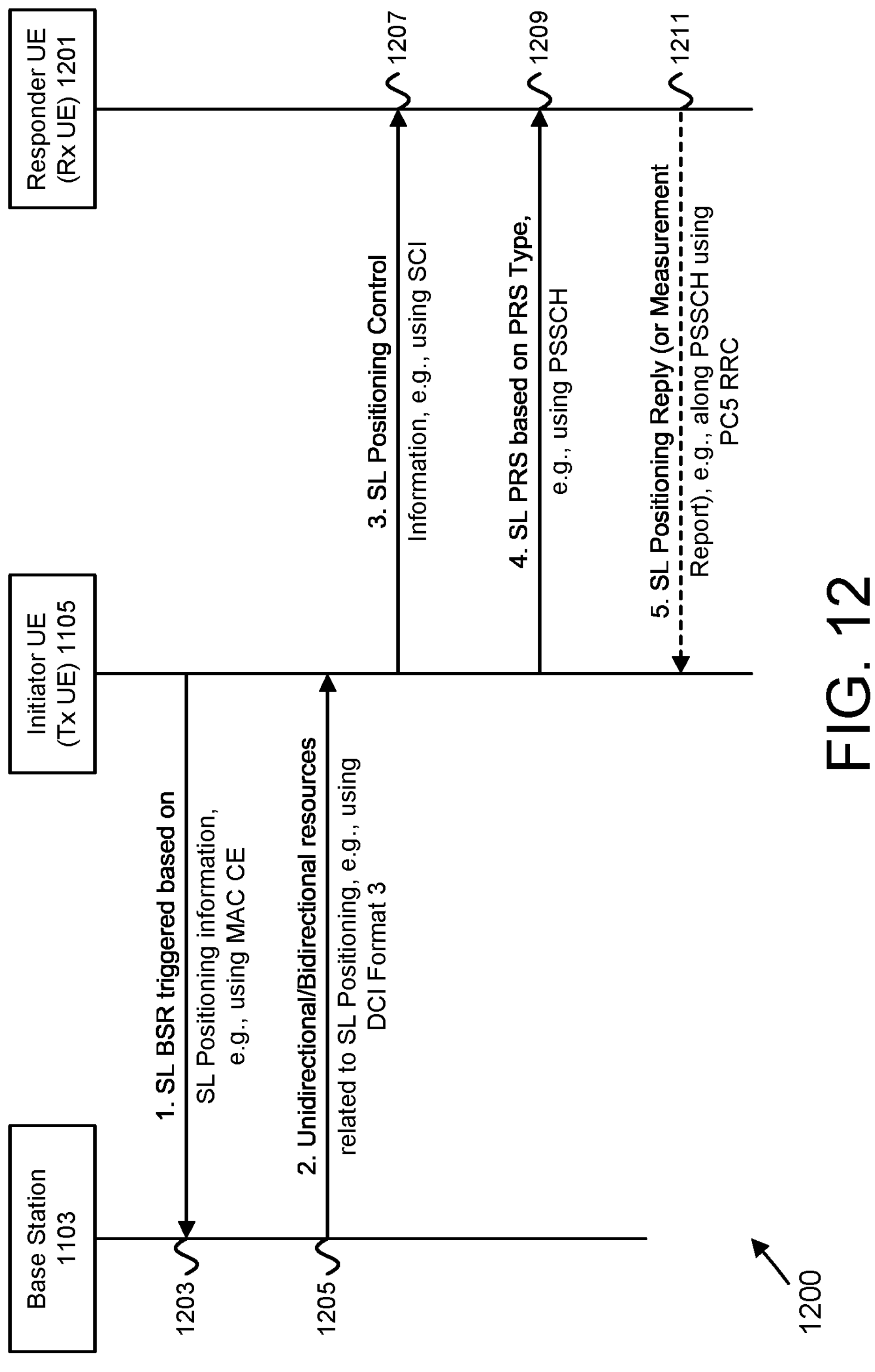
FIG. 12 is a diagram illustrating one embodiment of a SL Positioning BSR triggered Resource Request.

FIG. 12 depicts a procedure 1200 for SL Positioning BSR triggered Resource Request, according to embodiments of the disclosure. The procedure 1200 involved the base station 1103, the initiator UE 1105, and a responder UE 1201 (e.g., an embodiment of the RX UE 303, the responder UE 803, the responder UE 903, and/or the responder UE 1003).

At Step 1, the initiator UE 1105 transmits a sidelink BSR triggered based on SL positioning information (see messaging 1203). Here, the SL BSR may comprise a MAC CE and/or SR.

At Step 2, the base station 1103 responds by allocating unidirectional or bidirectional resources related to SL positioning (see messaging 1205). Here, the base station 1103 may use DCI, such as DCI Format 3, to send the resources allocation to the initiator UE 1105.

At Step 3, the initiator UE 1105 transmits SL positioning control information to the responder UE 1201 (see messaging 1207). Here, the initiator UE 1105 may use sidelink control information ("SCI") to send the SL positioning control information.

At Step 4, the initiator UE 1105 transmits a set of one or more SL positioning reference signals based on a PRS type (see messaging 1209). Here, the SL positioning reference signals may be transmitted using Physical Sidelink Shared Channel ("PSSCH").

At Step 5, the responder UE 1201 may send a SL positioning reply to the initiator UE 1105 (see messaging 1211). Alternatively, the responder UE 1201 may send a measurement report to the initiator UE 1105. Here, the SL positioning reply—or measurement report—may be send along with PSSCH, e.g., using PC5 RRC messaging.

In another implementation, Sidelink BSR like MAC CE could be defined containing fields for SL positioning bandwidth requirement, accuracy in terms of reliability and latency for of each destination ID. In another implementation, assistance information to gNB contains SL positioning bandwidth requirement, accuracy in terms of reliability and latency for of each destination ID.

According to embodiments of the fourth solution, different methods may be used for determining the cyclic shifts depending on if the ranging session is unicast, groupcast, or broadcast. A ranging session can be enabled by PRS Type signals that require cyclic shifts, in order to reduce PRS interference and maintain orthogonality among multiple UEs performing simultaneous ranging.

The cyclic shifts may be derived from the L1 positioning-specific IDs derived in the Second solution and are applicable to the following groupcast ranging scenario (one-to-many ranging): A) The configuration and application of a single cyclic shift; and/or B) The configuration and application of multiple cyclic shifts.

In the case of many-to-one ranging, the cyclic shifts can be derived based on the L1 positioning-specific IDs of the different group members, i.e., positioning-specific group member IDs.

In one implementation of the fourth solution, one source UE is transmitting to multiple destination UEs, wherein the different cyclic shifts are applied to PRS sequence corresponding to each of the destinations UEs and the time-frequency resources are overlapping for the PRS transmissions to multiple destination UEs.

In another implementation of the fourth solution, one source UE is transmitting to multiple destination UEs, wherein the different cyclic shifts applied to PRS sequence corresponding to different PRS occasions, e.g., an increased/decreased or a specific pattern of cyclic shifts value is applied for different PRS occasions in one positioning session. This is useful for minimizing the potential interference.

In another implementation of the fourth solution, one source UE is transmitting to multiple destination UEs, where the same cyclic shift is applied to the PRS sequence corresponding to each of the destination UEs and there PRS transmission to each of the destinations UEs is non-overlapping.

In some embodiments of the fourth solution, UE is configured with Mode-1 resource allocation and gNB configures the UE with one or multiple cyclic shifts (associated with L1 positioning-specific IDs in Solution 2). Two different UEs are not expected to apply same cyclic shift simultaneously at the same time-frequency resource.

In one implementation of the fourth solution, Mode-1 grant from gNB indicates the ranging id/destination id, time-frequency resource and cyclic shift value for SL PRS transmission. Tx UE perform SL PRS transmission to the indicated destination without performing any prioritization procedure.

In another implementation of the fourth solution, Mode-1 grant from gNB indicates the time-frequency resource and cyclic shift. Tx UE perform the prioritization procedure based on certain rules like.

1. Prioritize according to the accuracy, reliability and latency and select a set of responder UE(s).
2. Prioritize according to the destination/ranging ID to serve from the set of responder UE(s) prioritized by Rule 1 (above); otherwise, randomly select the destination ID/ranging ID.

The transmit ("Tx") UE performs SL PRS transmission to a destination according to the above rule.

In some embodiments, the initiator UE is configured with Mode-2 resource allocation and the initiator UE autonomously selects one or multiple cyclic shifts to be applied to the PRS sequence for transmission to one or multiple destination UEs. The initiator UE indicates the cyclic shift that it utilized to other UEs via SCI. Other UEs are not expected to apply the same cyclic shift simultaneously.

According to embodiments of the fifth solution, configuration and associated procedures are described for enabling and scheduling a reference device to act as an anchor for both network-assisted and UE-based positioning, which is applicable to both Uu and SL positioning. One of the functions of a reference device is to correct any Tx/Rx timing delays/errors related to the timing-based positioning methods that are applicable to both absolute and relative positioning using double differential timing method.

The key requirement of the reference device is the precise absolute location information associated to the reference device. In the case of network-assisted positioning the reference device may be configured by the location server or gNB with LMF/LMU functionality.

In the case of SL positioning, the reference device may be configured by the initiator UE through a reference UE location request to a third device, which is different to the initiator UE and responder UE. The base station may schedule the reference UE, however in other implementations the location server or initiator UE may also schedule the reference UE.

The reference device may comprise of one or more network entities, e.g., a UE, Road Side Unit ("RSU"), a gNB, a Remote Radio Head ("RRH").

In both cases, the reference UE may report its precise location information along with some positioning QoS information to the requesting entity, e.g., gNB, LMF, initiator UE, which may include but not limited to: A) 2D/3D absolute position coordinates including latitude and longitude and height/altitude; B) Relative Location including range and orientation information; C) Horizontal/vertical velocity estimates; D) Heading; and combinations thereof.

In an implementation, where the reference device is a UE, the location information of the reference UE can be provided based on one or more of the following methods: A) RAT-independent positioning methods such as GNSS, IMU sensors, WLAN, etc.; B) RAT-Dependent positioning methods such as DL-TDOA, Multi-RTT, etc.; and/or C) SL Positioning methods including relative and absolute location methods.

The configuring entity of the reference device select a reference device from a plurality of candidate reference devices, which may homogenous, e.g., candidate list of possible reference UEs. In another implementation, the configuring entity may select a reference device from a plurality of candidate heterogenous devices.

The criteria for the selection of a reference device may include: A) Quality of the position estimate in terms of horizontal and vertical accuracy; and/or B) Confidence interval of the reference device positioning estimate, e.g., a high confidence interval of the positioning indicates that a suitable candidate for reference device selection.

An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receive ("Rx") parameters.

Two antenna ports may be quasi-located with respect to a subset of the large-scale properties and different subset of large-scale properties may be indicated by a Quasi-Co-Location ("QCL") Type. The QCL Type can indicate which channel properties are the same between the two reference signals (e.g., on the two antenna ports). Thus, the reference signals can be linked to each other with respect to what the device can assume about their channel statistics or QCL properties. For example, qcl-Type may take one of the following values. Other qcl-Types may be defined based on combination of one or large-scale properties:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Spatial Rx parameters may include one or more of: angle of arrival ("AoA"), Dominant AoA, average AoA, angular spread, Power Angular Spectrum ("PAS") of AoA, angle of departure ("AoD"), average AoD, PAS of AoD, transmit/receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the device may not be able to perform omni-directional transmission, i.e., the device would need to form beams for directional transmission. A QCL-TypeD between two reference signals A and B, the reference signal A is considered to be spatially co-located with reference signal B and the device may assume that the reference signals A and B can be received with the same spatial filter (e.g., with the same Rx beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

Figure 13:
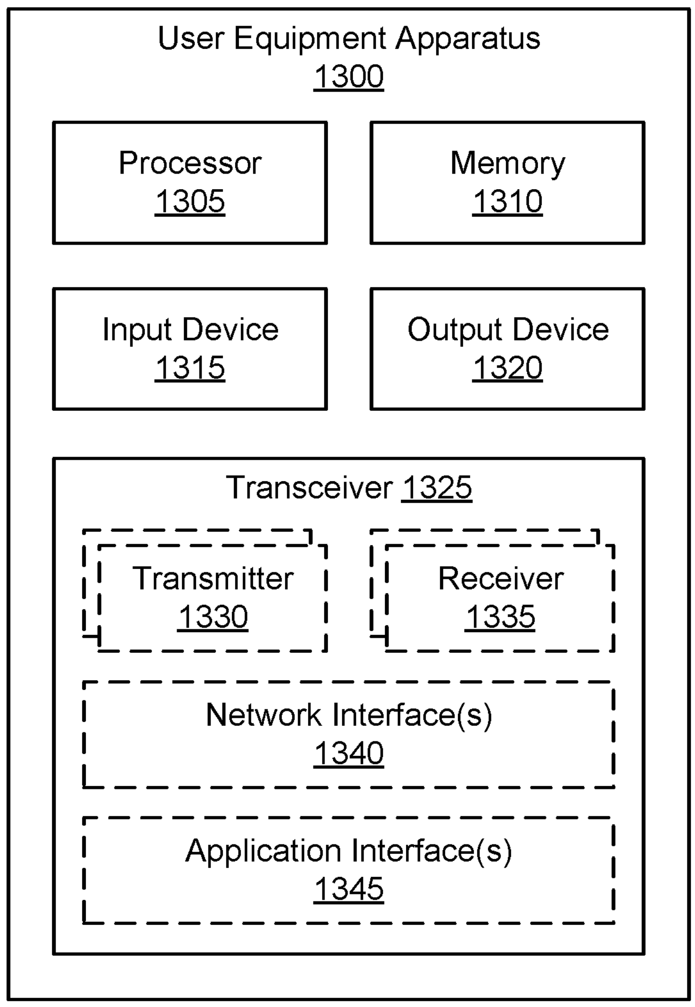
FIG. 13 is a block diagram illustrating one embodiment of a user equipment apparatus that may be used for sidelink positioning.

FIG. 13 depicts a user equipment apparatus 1300 that may be used for sidelink positioning, according to embodiments of the disclosure. In various embodiments, the user equipment apparatus 1300 is used to implement one or more of the solutions described above. The user equipment apparatus 1300 may be one embodiment of the remote unit 105, the UE 205, the Tx UE 301, the RX UE 303, the initiator UE 801, the responder UE 803, the initiator UE 901, the responder UE 903, the initiator UE 1001, and/or the responder UE 1003, as described above. Furthermore, the user equipment apparatus 1300 may include a processor 1305, a memory 1310, an input device 1315, an output device 1320, and a transceiver 1325.

In some embodiments, the input device 1315 and the output device 1320 are combined into a single device, such as a touchscreen. In certain embodiments, the user equipment apparatus 1300 may not include any input device 1315 and/or output device 1320. In various embodiments, the user equipment apparatus 1300 may include one or more of: the processor 1305, the memory 1310, and the transceiver 1325, and may not include the input device 1315 and/or the output device 1320.

As depicted, the transceiver 1325 includes at least one transmitter 1330 and at least one receiver 1335. In some embodiments, the transceiver 1325 communicates with one or more cells (or wireless coverage areas) supported by one or more base units 121. In various embodiments, the transceiver 1325 is operable on unlicensed spectrum. Moreover, the transceiver 1325 may include multiple UE panels supporting one or more beams. Additionally, the transceiver 1325 may support at least one network interface 1340 and/or application interface 1345. The application interface(s) 1345 may support one or more APIs. The network interface(s) 1340 may support 3GPP reference points, such as Uu, N1, PC5, etc. Other network interfaces 1340 may be supported, as understood by one of ordinary skill in the art.

The processor 1305, in one embodiment, may include any known controller capable of executing computer-readable instructions and/or capable of performing logical operations. For example, the processor 1305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1305 executes instructions stored in the memory 1310 to perform the methods and routines described herein. The processor 1305 is communicatively coupled to the memory 1310, the input device 1315, the output device 1320, and the transceiver 1325.

In various embodiments, the processor 1305 controls the user equipment apparatus 1300 to implement the above described UE behaviors. In certain embodiments, the processor 1305 may include an application processor (also known as "main processor") which manages application-domain and operating system ("OS") functions and a baseband processor (also known as "baseband radio processor") which manages radio functions.

In various embodiments, the processor 1305 triggers a SL positioning resource request by a higher-layer radio protocol. Via the transceiver 1325, the processor 1305 requests a set of SL resources from a RAN and receives a SL positioning resource grant for performing a SL positioning session with a responder UE. Here, the SL positioning resource grant is applicable to both the initiator UE and responder UE, where the SL positioning resource grant is associated with source and destination physical layer SL positioning identifiers. The processor 1305 reserves a set of SL positioning resources for performing a SL positioning session between the initiator UE and the responder UE. Additionally, the processor 1305 performs a SL positioning procedure using the reserved set of SL positioning resources.

In some embodiments, the initiating device is a UE and responding devices are UEs. In some embodiments, the SL positioning procedure includes a ranging method applied in the SL. In some embodiments, requesting the set of SL resources from the RAN includes transmitting an immediate ranging request between a pair of UEs. In such embodiments, the SL positioning resource grant includes a dynamic positioning grant issued to the initiator UE.

In some embodiments, requesting the set of SL resources from the RAN includes transmitting a periodic ranging request. In such embodiments, the SL positioning resource grant includes a configured positioning grant issued to the responder UE. In certain embodiments, the configured positioning grant is activated using RRC signaling. In one embodiment, the configured positioning grant is activated using DCI signaling. In another embodiment, the configured positioning grant is deactivated using DCI signaling.

In some embodiments, receiving the SL positioning resource grant for performing a SL positioning session with a responder UE includes receiving a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on L2 SL positioning IDs corresponding to the initiator UE and the responder UE, respectively. In another embodiment, the physical layer source ID and destination ID are implicitly derived based on a SL positioning transaction ID.

In some embodiments, the processor 1305 further prioritizes the SL positioning resource request with a highest available priority. In such embodiments, a SL buffer status report may be used to trigger a resource request to a base station in the RAN for the purposes of SL positioning. In some embodiments, a single or more combination of cyclic shifts is applied for a one-to-many ranging session according to a PRS Type.

In some embodiments, performing the SL positioning procedure includes establishing a standalone SL SRB and/or using a standalone SL positioning protocol for the purposes of transmission and reception of SL positioning information, said standalone SL SRB being separate from the SL-SRB0, the SL-SL-SRB1, the SL-SRB2, and the SL-SRB3 signaling radio bearers described herein, said standalone SL positioning protocol being separate from LTE positioning protocol, LTE positioning protocol annex, and NR positioning protocol, NR positioning protocol annex.

In some embodiments, performing a SL positioning procedure includes using a reference device that reports its precise location information along with positioning QoS metrics. In such embodiments, the reference device may be selected from a configured set of candidate reference devices based on a specified set of criteria.

The memory 1310, in one embodiment, is a computer readable storage medium. In some embodiments, the memory 1310 includes volatile computer storage media. For example, the memory 1310 may include a RAM, including dynamic RAM ("DRAM"), synchronous dynamic RAM ("SDRAM"), and/or static RAM ("SRAM"). In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data related to sidelink positioning. For example, the memory 1310 may store various parameters, panel/beam configurations, resource assignments, policies, and the like as described above. In certain embodiments, the memory 1310 also stores program code and related data, such as an operating system or other controller algorithms operating on the apparatus 1300.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, is designed to output visual, audible, and/or haptic signals. In some embodiments, the output device 1320 includes an electronically controllable display or display device capable of outputting visual data to a user. For example, the output device 1320 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1320 may include a wearable display separate from, but communicatively coupled to, the rest of the user equipment apparatus 1300, such as a smart watch, smart glasses, a heads-up display, or the like. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all or portions of the output device 1320 may be integrated with the input device 1315. For example, the input device 1315 and output device 1320 may form a touchscreen or similar touch-sensitive display. In other embodiments, the output device 1320 may be located near the input device 1315.

The transceiver 1325 communicates with one or more network functions of a mobile communication network via one or more access networks. The transceiver 1325 operates under the control of the processor 1305 to transmit messages, data, and other signals and also to receive messages, data, and other signals. For example, the processor 1305 may selectively activate the transceiver 1325 (or portions thereof) at particular times in order to send and receive messages.

The transceiver 1325 includes at least transmitter 1330 and at least one receiver 1335. One or more transmitters 1330 may be used to provide UL communication signals to a base unit 121, such as the UL transmissions described herein. Similarly, one or more receivers 1335 may be used to receive DL communication signals from the base unit 121, as described herein. Although only one transmitter 1330 and one receiver 1335 are illustrated, the user equipment apparatus 1300 may have any suitable number of transmitters 1330 and receivers 1335. Further, the transmitter(s) 1330 and the receiver(s) 1335 may be any suitable type of transmitters and receivers. In one embodiment, the transceiver 1325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1325, transmitters 1330, and receivers 1335 may be implemented as physically separate components that access a shared hardware resource and/or software resource, such as for example, the network interface 1340.

In various embodiments, one or more transmitters 1330 and/or one or more receivers 1335 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1330 and/or one or more receivers 1335 may be implemented and/or integrated into a multi-chip module. In some embodiments, other components such as the network interface 1340 or other hardware components/circuits may be integrated with any number of transmitters 1330 and/or receivers 1335 into a single chip. In such embodiment, the transmitters 1330 and receivers 1335 may be logically configured as a transceiver 1325 that uses one more common control signals or as modular transmitters 1330 and receivers 1335 implemented in the same hardware chip or in a multi-chip module.

Figure 14:
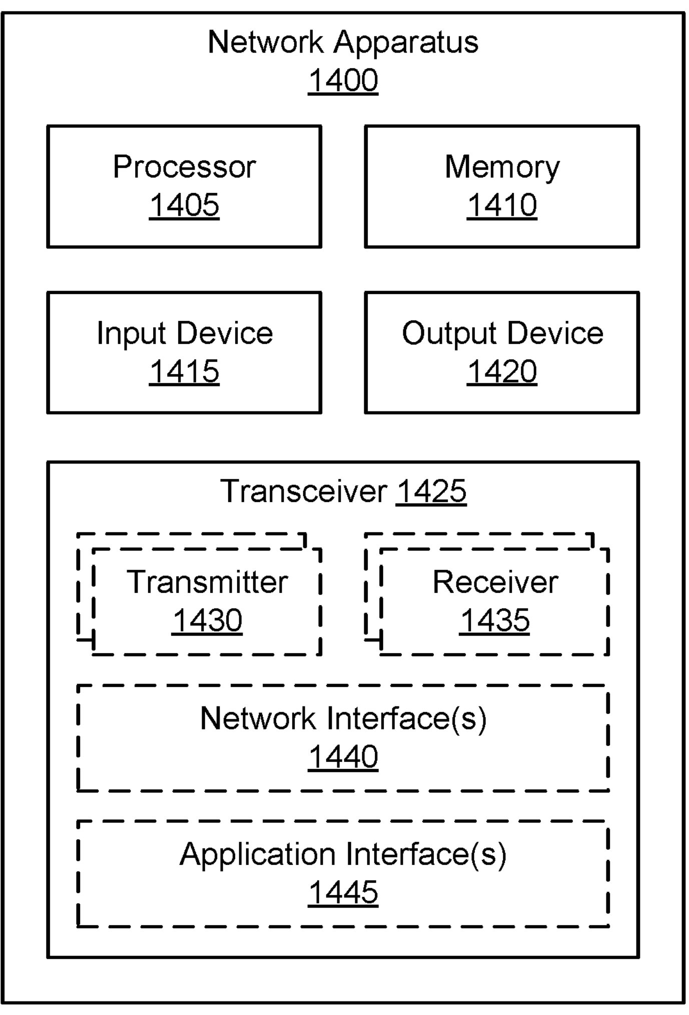
FIG. 14 is a block diagram illustrating one embodiment of a network apparatus that may be used for sidelink positioning.

FIG. 14 depicts a network apparatus 1400 that may be used for sidelink positioning, according to embodiments of the disclosure. In one embodiment, network apparatus 1400 may be one implementation of a RAN device, such as the base unit 121, the RAN node 207, and/or the base station 1103, as described above. In another embodiment, the network apparatus 1400 may be one implementation of a location server, such as the LMF 146, the LMF server 501, the LMF server 605, and/or the location server 1101, as described above. Furthermore, the network apparatus 1400 may include a processor 1405, a memory 1410, an input device 1415, an output device 1420, and a transceiver 1425.

In some embodiments, the input device 1415 and the output device 1420 are combined into a single device, such as a touchscreen. In certain embodiments, the network apparatus 1400 may not include any input device 1415 and/or output device 1420. In various embodiments, the network apparatus 1400 may include one or more of: the processor 1405, the memory 1410, and the transceiver 1425, and may not include the input device 1415 and/or the output device 1420.

As depicted, the transceiver 1425 includes at least one transmitter 1430 and at least one receiver 1435. Here, the transceiver 1425 communicates with one or more remote units 105. Additionally, the transceiver 1425 may support at least one network interface 1440 and/or application interface 1445. The application interface(s) 1445 may support one or more APIs. The network interface(s) 1440 may support 3GPP reference points, such as Uu, N1, N2 and N3. Other network interfaces 1440 may be supported, as understood by one of ordinary skill in the art.

The processor 1405, in one embodiment, may include any known controller capable of executing computer-readable instructions and/or capable of performing logical operations. For example, the processor 1405 may be a microcontroller, a microprocessor, a CPU, a GPU, an auxiliary processing unit, a FPGA, or similar programmable controller. In some embodiments, the processor 1405 executes instructions stored in the memory 1410 to perform the methods and routines described herein. The processor 1405 is communicatively coupled to the memory 1410, the input device 1415, the output device 1420, and the transceiver 1425.

In various embodiments, the network apparatus 1400 is a RAN node (e.g., gNB) that communicates with one or more UEs, as described herein. In such embodiments, the processor 1405 controls the network apparatus 1400 to perform the above described RAN behaviors. When operating as a RAN node, the processor 1405 may include an application processor (also known as "main processor") which manages application-domain and operating system ("OS") functions and a baseband processor (also known as "baseband radio processor") which manages radio functions.

In various embodiments, via the transceiver 1425, the processor 1405 receives a request for a set of sidelink resources from an initiator UE. Via the transceiver 1425, the processor 1405 transmits a sidelink positioning resource grant for performing a sidelink positioning session between the initiator UE and a responder UE. Here, the sidelink positioning resource grant is applicable to both the initiator UE and the responder UE. The transceiver 1425 receives a measurement report from the initiator UE, where the measurement report is associated with a sidelink positioning session between the initiator UE and the responder UE and where the sidelink positioning resource grant is associated with source and destination physical layer sidelink positioning identifiers.

In some embodiments, receiving the request for a set of sidelink resources includes receiving an immediate ranging request between a pair of UEs. In such embodiments, the sidelink positioning resource grant includes a dynamic positioning grant issued to the initiator UE. In some embodiments, receiving the request for a set of sidelink resources includes receiving a periodic ranging request. In such embodiments, the sidelink positioning resource grant includes a configured positioning grant issued to the responder UE.

In certain embodiments, the configured positioning grant is activated using RRC signaling. In one embodiment, the configured positioning grant is activated using DCI signaling. In another embodiment, the configured positioning grant is deactivated using DCI signaling.

In some embodiments, transmitting the sidelink positioning resource grant includes transmitting a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on layer-2 sidelink positioning IDs corresponding to the initiator UE and the responder UE, respectively. In another embodiment, the physical layer source ID and destination ID are implicitly derived based on a sidelink positioning transaction ID.

The memory 1410, in one embodiment, is a computer readable storage medium. In some embodiments, the memory 1410 includes volatile computer storage media. For example, the memory 1410 may include a RAM, including dynamic RAM ("DRAM"), synchronous dynamic RAM ("SDRAM"), and/or static RAM ("SRAM"). In some embodiments, the memory 1410 includes non-volatile computer storage media. For example, the memory 1410 may include a hard disk drive, a flash memory, or any other suitable non-volatile computer storage device. In some embodiments, the memory 1410 includes both volatile and non-volatile computer storage media.

In some embodiments, the memory 1410 stores data related to sidelink positioning. For example, the memory 1410 may store parameters, configurations, resource assignments, policies, and the like, as described above. In certain embodiments, the memory 1410 also stores program code and related data, such as an operating system or other controller algorithms operating on the apparatus 1400.

The input device 1415, in one embodiment, may include any known computer input device including a touch panel, a button, a keyboard, a stylus, a microphone, or the like. In some embodiments, the input device 1415 may be integrated with the output device 1420, for example, as a touchscreen or similar touch-sensitive display. In some embodiments, the input device 1415 includes a touchscreen such that text may be input using a virtual keyboard displayed on the touchscreen and/or by handwriting on the touchscreen. In some embodiments, the input device 1415 includes two or more different devices, such as a keyboard and a touch panel.

The output device 1420, in one embodiment, is designed to output visual, audible, and/or haptic signals. In some embodiments, the output device 1420 includes an electronically controllable display or display device capable of outputting visual data to a user. For example, the output device 1420 may include, but is not limited to, an LCD display, an LED display, an OLED display, a projector, or similar display device capable of outputting images, text, or the like to a user. As another, non-limiting, example, the output device 1420 may include a wearable display separate from, but communicatively coupled to, the rest of the network apparatus 1400, such as a smart watch, smart glasses, a heads-up display, or the like. Further, the output device 1420 may be a component of a smart phone, a personal digital assistant, a television, a table computer, a notebook (laptop) computer, a personal computer, a vehicle dashboard, or the like.

In certain embodiments, the output device 1420 includes one or more speakers for producing sound. For example, the output device 1420 may produce an audible alert or notification (e.g., a beep or chime). In some embodiments, the output device 1420 includes one or more haptic devices for producing vibrations, motion, or other haptic feedback. In some embodiments, all or portions of the output device 1420 may be integrated with the input device 1415. For example, the input device 1415 and output device 1420 may form a touchscreen or similar touch-sensitive display. In other embodiments, the output device 1420 may be located near the input device 1415.

The transceiver 1425 includes at least transmitter 1430 and at least one receiver 1435. One or more transmitters 1430 may be used to communicate with the UE, as described herein. Similarly, one or more receivers 1435 may be used to communicate with network functions in the Public Land Mobile Network ("PLMN") and/or RAN, as described herein. Although only one transmitter 1430 and one receiver 1435 are illustrated, the network apparatus 1400 may have any suitable number of transmitters 1430 and receivers 1435. Further, the transmitter(s) 1430 and the receiver(s) 1435 may be any suitable type of transmitters and receivers.

Figure 15:
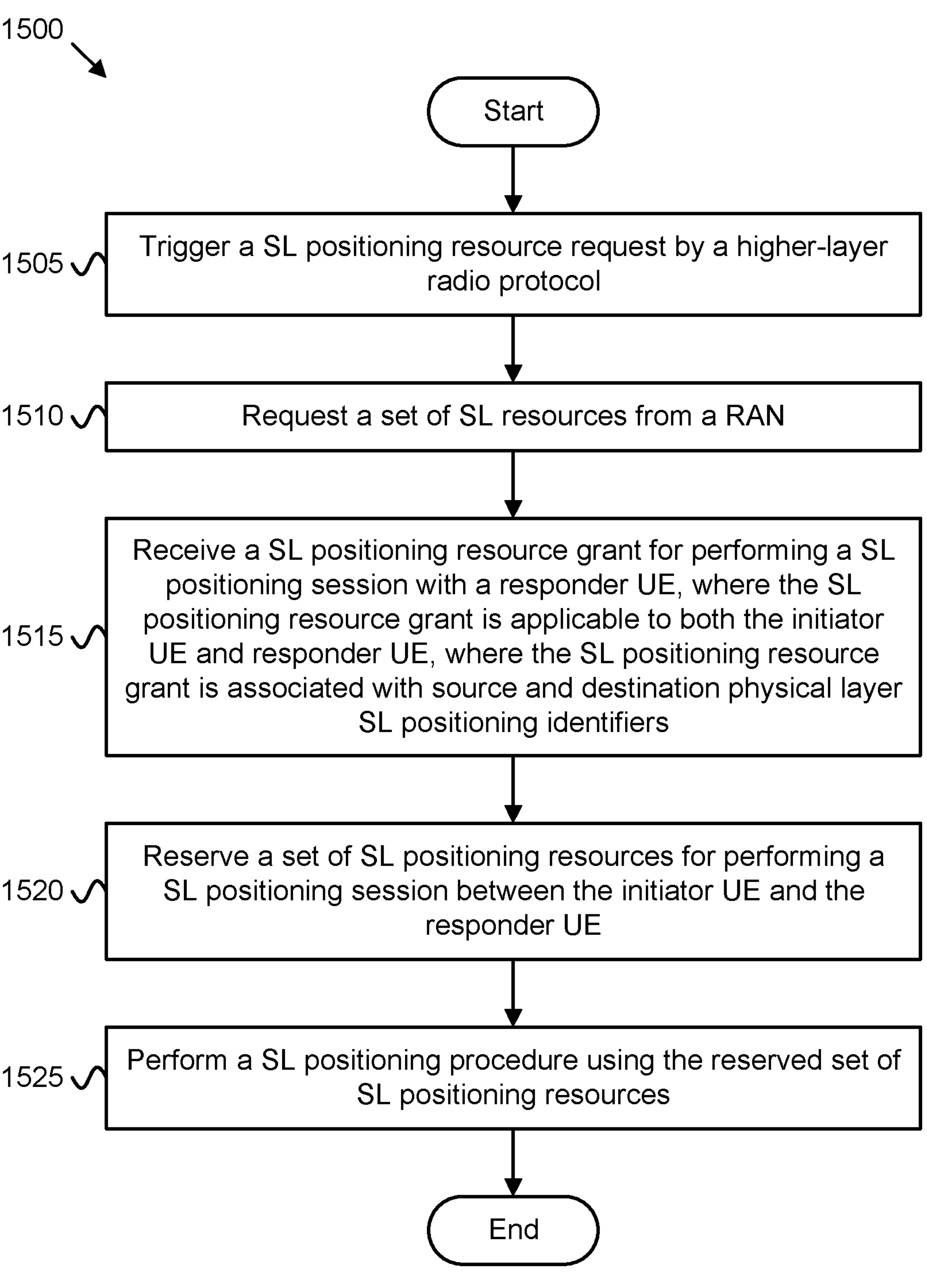
FIG. 15 is a flowchart diagram illustrating one embodiment of a method for sidelink positioning.

FIG. 15 depicts one embodiment of a method 1500 for sidelink positioning, according to embodiments of the disclosure. In various embodiments, the method 1500 is performed by a UE device, such as the remote unit 105, the UE 205, the TX UE 301, the RX UE 303, the initiator UE 801, the responder UE 803, the initiator UE 901, the responder UE 903, the initiator UE 1001, the responder UE 1003, and/or the user equipment apparatus 1300, described above as described above. In some embodiments, the method 1500 is performed by a processor, such as a microcontroller, a microprocessor, a CPU, a GPU, an auxiliary processing unit, a FPGA, or the like.

The method 1500 begins and triggers 1505 a SL positioning resource request by a higher-layer radio protocol. The method 1500 includes requesting 1510 a set of SL resources from a RAN. The method 1500 includes receiving 1515 a SL positioning resource grant for performing a SL positioning session with a responder UE. Here, the SL positioning resource grant is applicable to both the initiator UE and responder UE, where the SL positioning resource grant is associated with source and destination physical layer SL positioning identifiers. The method 1500 includes reserving 1520 a set of SL positioning resources for performing a SL positioning session between the initiator UE and the responder UE. The method 1500 includes performing 1525 a SL positioning procedure using the reserved set of SL positioning resources. The method 1500 ends.

Figure 16:
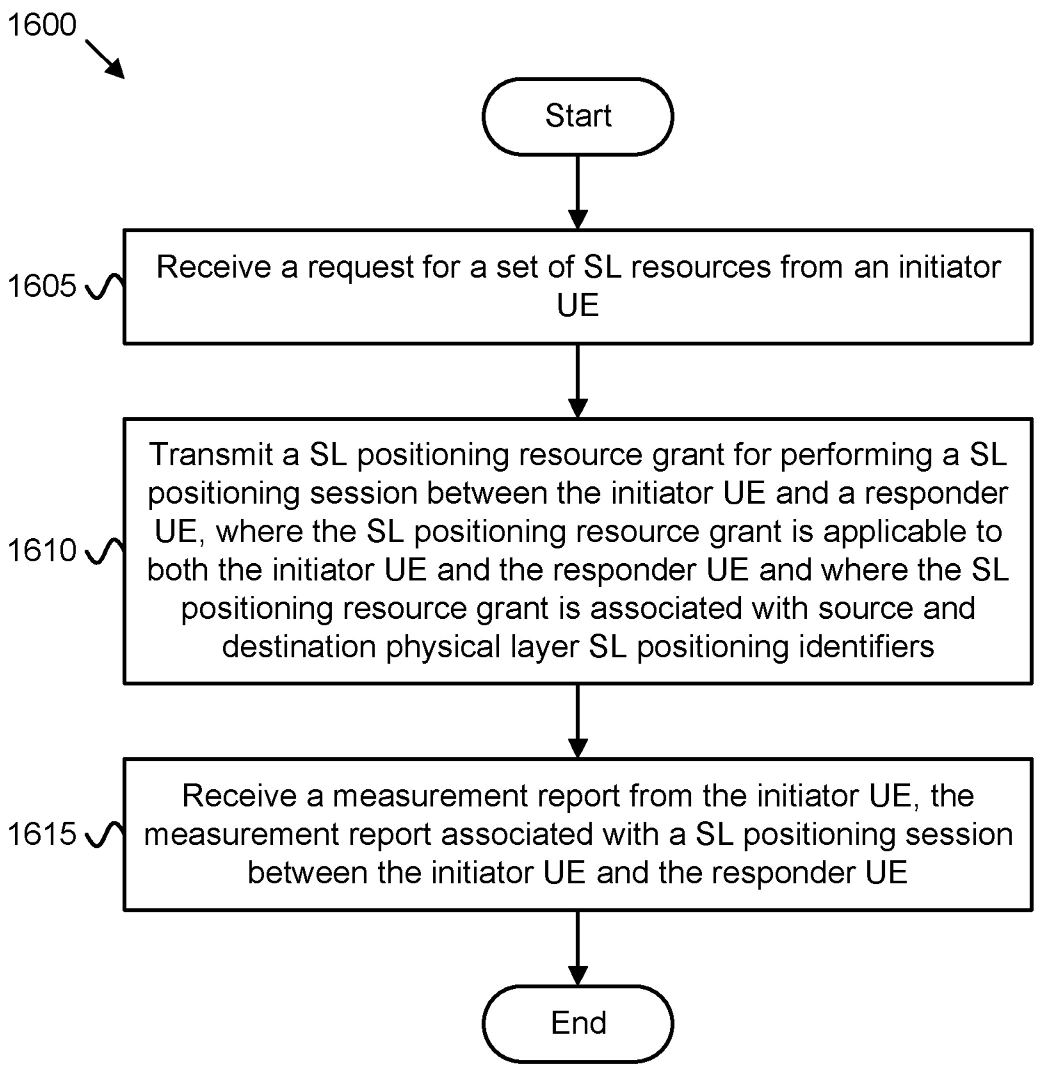
FIG. 16 is a flowchart diagram illustrating another embodiment of a method for sidelink positioning.

FIG. 16 depicts one embodiment of a method 1600 for sidelink positioning, according to embodiments of the disclosure. In various embodiments, the method 1600 is performed by a network entity, such as the base unit 121, the RAN node 207, the base station 1103, and/or the network apparatus 1400, described above as described above. In some embodiments, the method 1600 is performed by a processor, such as a microcontroller, a microprocessor, a CPU, a GPU, an auxiliary processing unit, a FPGA, or the like.

The method 1600 begins and receives 1605 a request for a set of SL resources from an initiator UE. The method 1600 includes transmitting 1610 a SL positioning resource grant for performing a SL positioning session between the initiator UE and a responder UE, where the SL positioning resource grant is applicable to both the initiator UE and the responder UE and where the SL positioning resource grant is associated with source and destination physical layer SL positioning identifiers. The method 1600 includes receiving 1615 a measurement report from the initiator UE, the measurement report associated with a SL positioning session between the initiator UE and the responder UE. The method 1600 ends.

Disclosed herein is a first apparatus for sidelink positioning, according to embodiments of the disclosure. The first apparatus may be implemented by a remote unit 105, the UE 205, the TX UE 301, the RX UE 303, the initiator UE 801, the responder UE 803, the initiator UE 901, the responder UE 903, the initiator UE 1001, the responder UE 1003, and/or the user equipment apparatus 1300, described above. The first apparatus includes a transceiver and a processor that triggers a SL positioning resource request by a higher-layer radio protocol. The transceiver requests a set of SL resources from a RAN and receives a SL positioning resource grant for performing a SL positioning session with a responder UE. Here, the SL positioning resource grant is applicable to both the initiator UE and responder UE, where the SL positioning resource grant is associated with source and destination physical layer SL positioning identifiers. The processor reserves a set of SL positioning resources for performing a SL positioning session between the initiator UE and the responder UE. The processor performs a SL positioning procedure using the reserved set of SL positioning resources.

In some embodiments, the initiating device is a UE and responding devices are UEs. In some embodiments, the SL positioning procedure includes a ranging method applied in the SL. In some embodiments, requesting the set of SL resources from the RAN includes transmitting an immediate ranging request between a pair of UEs. In such embodiments, the SL positioning resource grant includes a dynamic positioning grant issued to the initiator UE.

In some embodiments, requesting the set of SL resources from the RAN includes transmitting a periodic ranging request. In such embodiments, the SL positioning resource grant includes a configured positioning grant issued to the responder UE. In certain embodiments, the configured positioning grant is activated using RRC signaling. In one embodiment, the configured positioning grant is activated using DCI signaling. In another embodiment, the configured positioning grant is deactivated using DCI signaling.

In some embodiments, receiving the SL positioning resource grant for performing a SL positioning session with a responder UE includes receiving a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on L2 SL positioning IDs corresponding to the initiator UE and the responder UE, respectively. In another embodiment, the physical layer source ID and destination ID are implicitly derived based on a SL positioning transaction ID.

In some embodiments, the processor further prioritizes the SL positioning resource request with a highest available priority. In such embodiments, a SL buffer status report may be used to trigger a resource request to a base station in the RAN for the purposes of SL positioning. In some embodiments, a single or more combination of cyclic shifts is applied for a one-to-many ranging session according to a PRS Type.

In some embodiments, performing the SL positioning procedure includes establishing a standalone SL SRB and/or using a standalone SL positioning protocol for the purposes of transmission and reception of SL positioning information, said standalone SL SRB being separate from the SL-SRB0, the SL-SL-SRB1, the SL-SRB2, and the SL-SRB3 signaling radio bearers described herein, said standalone SL positioning protocol being separate from LTE positioning protocol, LTE positioning protocol annex, and NR positioning protocol, NR positioning protocol annex.

In some embodiments, performing a SL positioning procedure includes using a reference device that reports its precise location information along with positioning QoS metrics. In such embodiments, the reference device may be selected from a configured set of candidate reference devices based on a specified set of criteria.

Disclosed herein is a first method for sidelink positioning, according to embodiments of the disclosure. The first method may be performed by a remote unit 105, the UE 205, the TX UE 301, the RX UE 303, the initiator UE 801, the responder UE 803, the initiator UE 901, the responder UE 903, the initiator UE 1001, the responder UE 1003, and/or the user equipment apparatus 1300, described above. The first method includes triggering a SL positioning resource request by a higher-layer radio protocol and requesting a set of SL resources from a RAN. The first method includes receiving a SL positioning resource grant for performing a SL positioning session with a responder UE. Here, the SL positioning resource grant is applicable to both the initiator UE and responder UE, where the SL positioning resource grant is associated with source and destination physical layer SL positioning identifiers. The first method includes reserving a set of SL positioning resources for performing a SL positioning session between the initiator UE and the responder UE. The first method includes performing a SL positioning procedure using the reserved set of SL positioning resources.

In some embodiments, the initiating device is a UE and responding devices are UEs. In some embodiments, the SL positioning procedure includes a ranging method applied in the SL. In some embodiments, requesting the set of SL resources from the RAN includes transmitting an immediate ranging request between a pair of UEs. In such embodiments, the SL positioning resource grant includes a dynamic positioning grant issued to the initiator UE.

In some embodiments, requesting the set of SL resources from the RAN includes transmitting a periodic ranging request. In such embodiments, the SL positioning resource grant includes a configured positioning grant issued to the responder UE. In certain embodiments, the configured positioning grant is activated using RRC signaling. In one embodiment, the configured positioning grant is activated using DCI signaling. In another embodiment, the configured positioning grant is deactivated using DCI signaling.

In some embodiments, receiving the SL positioning resource grant for performing a SL positioning session with a responder UE includes receiving a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on L2 SL positioning IDs corresponding to the initiator UE and the responder UE, respectively. In another embodiment, the physical layer source ID and destination ID are implicitly derived based on a SL positioning transaction ID.

In some embodiments, the first method further includes prioritizing the SL positioning resource request with a highest available priority. In such embodiments, a SL buffer status report is used to trigger a resource request to a base station in the RAN for the purposes of SL positioning. In some embodiments, a single or more combination of cyclic shifts is applied for a one-to-many ranging session according to a PRS Type.

In some embodiments, performing the SL positioning procedure includes establishing a standalone SL SRB and/or using a standalone SL positioning protocol for the purposes of transmission and reception of sidelink positioning information, said standalone SL SRB being separate from the SL-SRB0, the SL-SL-SRB1, the SL-SRB2, and the SL- SRB3 signaling radio bearers described herein, said standalone SL positioning protocol being separate from LTE positioning protocol, LTE positioning protocol annex, and NR positioning protocol, NR positioning protocol annex.

In some embodiments, performing a sidelink positioning procedure includes using a reference device that reports its precise location information along with positioning QoS metrics. In such embodiments, the reference device may be selected from a configured set of candidate reference devices based on a specified set of criteria.

Disclosed herein is a second apparatus for sidelink positioning, according to embodiments of the disclosure. The second apparatus may be implemented by a network entity, such as the base unit 121, the RAN node 207, the base station 1103, and/or the network apparatus 1400, described above. The second apparatus includes a processor and a transceiver that receives a request for a set of sidelink resources from an initiator UE. Via the transceiver, the processor transmits a sidelink positioning resource grant for performing a sidelink positioning session between the initiator UE and a responder UE. Here, the sidelink positioning resource grant is applicable to both the initiator UE and the responder UE. The transceiver receives a measurement report from the initiator UE, where the measurement report is associated with a sidelink positioning session between the initiator UE and the responder UE and where the sidelink positioning resource grant is associated with source and destination physical layer sidelink positioning identifiers.

In some embodiments, receiving the request for a set of sidelink resources includes receiving an immediate ranging request between a pair of UEs. In such embodiments, the sidelink positioning resource grant includes a dynamic positioning grant issued to the initiator UE. In some embodiments, receiving the request for a set of sidelink resources includes receiving a periodic ranging request. In such embodiments, the sidelink positioning resource grant includes a configured positioning grant issued to the responder UE. In certain embodiments, the configured positioning grant is activated using RRC signaling. In one embodiment, the configured positioning grant is activated using DCI signaling. In another embodiment, the configured positioning grant is deactivated using DCI signaling.

In some embodiments, transmitting the sidelink positioning resource grant includes transmitting a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on layer-2 sidelink positioning IDs corresponding to the initiator UE and the responder UE, respectively. In another embodiment, the physical layer source ID and destination ID are implicitly derived based on a sidelink positioning transaction ID.

Disclosed herein is a second method for sidelink positioning, according to embodiments of the disclosure. The second method may be performed by a network entity, such as the base unit 121, the RAN node 207, the base station 1103, and/or the network apparatus 1400, described above. The second method includes receiving a request for a set of sidelink resources from an initiator UE and transmitting a sidelink positioning resource grant for performing a sidelink positioning session between the initiator UE and a responder UE. Here, the sidelink positioning resource grant is applicable to both the initiator UE and the responder UE. The second method includes receiving a measurement report from the initiator UE, where the measurement report is associated with a sidelink positioning session between the initiator UE and the responder UE and where the sidelink positioning resource grant is associated with source and destination physical layer sidelink positioning identifiers.

In some embodiments, receiving the request for a set of sidelink resources includes receiving an immediate ranging request between a pair of UEs. In such embodiments, the sidelink positioning resource grant includes a dynamic positioning grant issued to the initiator UE. In some embodiments, receiving the request for a set of sidelink resources includes receiving a periodic ranging request. In such embodiments, the sidelink positioning resource grant includes a configured positioning grant issued to the responder UE. In certain embodiments, the configured positioning grant is activated using RRC signaling. In one embodiment, the configured positioning grant is activated using DCI signaling. In another embodiment, the configured positioning grant is deactivated using DCI signaling.

In some embodiments, transmitting the sidelink positioning resource grant includes transmitting a configuration for a plurality of configured grants to the initiator UE, where a subset of the configured grants is used by the initiator UE and where a remainder of the configured grants is to be used by the responder UE. In certain embodiments, the plurality of configured grants is applicable to one or more configured combinations of unicast, groupcast or broadcast ranging methods.

In some embodiments, the physical layer source ID and destination ID are derived corresponding to the initiator UE and the responder UE, respectively. In one embodiment, the physical layer source ID and destination ID are implicitly derived based on layer-2 sidelink positioning IDs corresponding to the initiator UE and the responder UE, respectively. In another embodiment, the physical layer source ID and destination ID are implicitly derived based on a sidelink positioning transaction ID.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by an initiator User Equipment ("UE"), the method comprising:

triggering a sidelink positioning resource request by a higher-layer radio protocol;

requesting a set of sidelink resources from a radio access network ("RAN"), wherein requesting the set of sidelink resources from the RAN is based on triggered sidelink positioning associated with the initiator UE or a responder UE;

receiving a sidelink positioning resource grant for performing a sidelink positioning session with the responder UE, wherein the sidelink positioning resource grant is applicable to both the initiator UE and the responder UE, wherein the sidelink positioning resource grant is associated with source and destination physical layer sidelink positioning identifiers ("IDs");

reserving a set of sidelink positioning resources, from the sidelink positioning resource grant, for performing the sidelink positioning session between the initiator UE and the responder UE; and performing the sidelink positioning session using the reserved set of sidelink positioning resources.

2. The method of claim 1, wherein the sidelink positioning session comprises a ranging method applied in the sidelink.

3. The method of claim 1, wherein requesting the set of sidelink resources from the RAN comprises transmitting a ranging request, and wherein the sidelink positioning resource grant comprises a dynamic positioning grant issued to the initiator UE.

4. The method of claim 1, wherein requesting the set of sidelink resources from the RAN comprises transmitting a periodic ranging request, wherein the sidelink positioning resource grant comprises a configured positioning grant issued to the responder UE.

5. The method of claim 4, wherein the configured positioning grant is activated using RRC signaling.

6. The method of claim 4, wherein the configured positioning grant is activated using DCI signaling.

7. The method of claim 1, wherein receiving the sidelink positioning resource grant comprises receiving a configuration for a plurality of configured grants to the initiator UE, wherein a subset of the configured grants is used by the initiator UE and wherein a remainder of the configured grants is reserved for the responder UE.

8. The method of claim 7, wherein the plurality of configured grants are applicable to one or more configured combinations of unicast, groupcast or broadcast ranging methods.

9. The method of claim 1, wherein the source and destination physical layer IDs are derived corresponding to the initiator UE and responder UE, respectively.

10. The method of claim 1, wherein the source and destination physical layer IDs are implicitly derived based on one of:

layer-2 sidelink positioning IDs corresponding to the initiator UE and responder UE, respectively; or a sidelink positioning transaction ID.

11. The method of claim 1, further comprising prioritizing the sidelink positioning resource request with a highest available priority, wherein a sidelink buffer status report is used to trigger a resource request to the RAN for SL positioning.

12. The method of claim 1, wherein a single or more combination of cyclic shifts is applied for a one-to-many ranging session according to a positioning reference signal ("PRS") Type.

13. The method of claim 1, wherein performing the sidelink positioning session comprises establishing a standalone SL signaling radio bearer ("SRB") and/or using a standalone SL positioning protocol for transmission and reception of sidelink positioning information, said standalone SL SRB being separate from the SL-SRB0, the SL-SL-SRB1, the SL-SRB2, and the SL-SRB3 signaling radio bearers described herein, said standalone SL positioning protocol being separate from LTE positioning protocol, LTE positioning protocol annex, and NR positioning protocol, NR positioning protocol annex.

14. An initiator User Equipment ("UE") for wireless communication, comprising:

at least one memory; and at least one processor coupled with the at least one memory and configured to cause the UE to:

trigger a sidelink positioning resource request by a higher-layer radio protocol;

request a set of sidelink resources from a radio access network ("RAN"), wherein requesting the set of sidelink resources from the RAN is based on triggered sidelink positioning associated with the initiator UE or a responder UE;

receive a sidelink positioning resource grant for performing a sidelink positioning session with the responder UE, wherein the sidelink positioning resource grant is applicable to both the initiator UE and the responder UE, wherein the sidelink positioning resource grant is associated with source and destination physical layer sidelink positioning identifiers ("IDs");

reserve a set of sidelink positioning resources, from the sidelink positioning resource grant, for performing the sidelink positioning session between the initiator UE and the responder UE; and perform the sidelink positioning session using the reserved set of sidelink positioning resources.

15. A base station for wireless communication, comprising:

at least one memory; and at least one processor coupled with the at least one memory and configured to cause the base station to:

receive a request for a set of sidelink resources from an initiator UE, wherein the request is based on triggered sidelink positioning associated with the initiator UE or a responder UE;

transmit a sidelink positioning resource grant for performing a sidelink positioning session between the initiator UE and the responder UE, wherein the sidelink positioning resource grant is applicable to both the initiator UE and the responder UE, wherein the sidelink positioning resource grant is associated with a source and destination physical layer sidelink positioning identifier; and receive a measurement report from the initiator UE, the measurement report associated with a sidelink positioning session between the initiator UE and the responder UE.

16. The base station of claim 15, wherein the sidelink positioning resource grant comprises a dynamic positioning grant issued to the initiator UE.

17. The base station of claim 15, wherein to receive the request, the at least one processor is configured to cause the base station to receive a periodic ranging request, wherein the sidelink positioning resource grant comprises a configured positioning grant issued to the responder UE.

18. The base station of claim 17, wherein the configured positioning grant is activated using RRC signaling.

19. The base station of claim 17, wherein the configured positioning grant is activated using DCI signaling.

20. The base station of claim 15, wherein to transmit the sidelink positioning resource grant, the at least one processor is configured to cause the base station to transmit a configuration for a plurality of configured grants to the initiator UE, wherein a subset of the configured grants is granted to the initiator UE and wherein a remainder of the configured grants is granted to the responder UE.

* * * * *